(12) United States Patent
Yonekura et al.

(10) Patent No.: US 6,345,498 B2
(45) Date of Patent: Feb. 12, 2002

(54) EXHAUST GAS PURIFIER FOR INTERNAL COMBUSTION ENGINE

(75) Inventors: Tosiaki Yonekura, Hyogo; Satoshi Wachi, Tokyo; Hideaki Katashiba, Tokyo; Hirofumi Ohuchi, Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,503

(22) Filed: Dec. 8, 1999

(30) Foreign Application Priority Data

Jun. 3, 1999 (JP) ............................................. 11-157170

(51) Int. Cl.$^7$ ................................................ F01N 3/00
(52) U.S. Cl. ............................. 60/277; 60/276; 60/285
(58) Field of Search ........................ 60/274, 276, 277, 60/285, 295, 301

(56) References Cited

U.S. PATENT DOCUMENTS

| 5,220,788 A | * | 6/1993 | Kurita et al. | 60/277 |
| 5,577,382 A | * | 11/1996 | Kihara et al. | 60/277 |
| 5,636,514 A | * | 6/1997 | Seki | 60/277 |
| 5,655,363 A | * | 8/1997 | Ito et al. | 60/277 |
| 5,678,402 A | * | 10/1997 | Kitagawa et al. | 60/277 |
| 5,732,553 A | * | 3/1998 | Mitsutani | 60/277 |
| 5,735,119 A | * | 4/1998 | Asanuma et al. | 60/285 |
| 5,771,685 A | * | 6/1998 | Hepburn | 60/301 |
| 5,937,638 A | * | 8/1999 | Akazaki et al. | 60/277 |
| 5,945,597 A | * | 8/1999 | Poublon et al. | 60/277 |
| 5,956,940 A | * | 9/1999 | Manaka et al. | 60/277 |
| 6,148,612 A | * | 11/2000 | Yamashita et al. | 60/277 |

FOREIGN PATENT DOCUMENTS

JP        8-232644        9/1996

* cited by examiner

Primary Examiner—Thomas Denion
Assistant Examiner—Tu M. Nguyen
(74) Attorney, Agent, or Firm—Sughrue Mion, PLLC

(57) ABSTRACT

An exhaust gas purifier for an internal combustion engine which is capable of detecting the deterioration degree of an NOx catalyst making use of a time elapsed from the time when the air-fuel ratio of exhaust gas flowing into an NOx absorber catalyst is made rich to the time when the air-fuel ratio of exhaust gas flowing out from the NOx absorber catalyst becomes rich.

When the time required for a change in the output level of an air-fuel ratio sensor is shorter than a predetermined time, the time required for the change in the output level of the air-fuel ratio sensor is lengthened by reducing the rich degree at the time of rich operation, thereby judging the deterioration degree of the NOx absorber catalyst with accuracy.

4 Claims, 19 Drawing Sheets

RICH ← STOICHIOMETRIC → LEAN

DETERIORATION DEGREE
OF NOx OCCLUDING
CATALYST

MAXIMUM AMOUNT OF
OCCLUDED NOx

MAX

EXHAUST GAS PURIFIER FOR INTERNAL COMBUSTION ENGINE

BACKGROUND OF THE INVENTION

1. Field of the Invention

The present invention relates to an exhaust gas purifier for an internal combustion engine.

2. Description of the Prior Art

FIG. 19 is a structural diagram of an exhaust gas purifier for an internal combustion engine 1 disclosed by Japanese Laid-open Patent Application No. 8-232644. In FIG. 19, reference numeral 1 denotes an internal combustion engine, 2 a piston, 3 a combustion chamber, 4 a spark plug, 5 an inlet valve, 6 an inlet port, 7 an exhaust valve, and 8 an exhaust port. The inlet port 6 is connected to a surge tank 10 via a branch pipe 9, and a fuel injection valve 11 for injecting fuel into the inlet port 6 is disposed in the branch pipe 9. The surge tank 10 is connected to an air cleaner 13 via an inlet duct 12, and a throttle valve 14 is arranged in the inlet duct 12. The exhaust port 8 is connected to a casing 17 incorporating an NOx absorber catalyst 18 via an exhaust manifold 15 and an exhaust pipe 16.

An electronic control unit 30 is a digital computer which comprises a ROM (read only memory) 32, a RAM (random access memory) 33, a CPU (microprocessor) 34, a back-up RAM 35 which is always connected to a power source, an input port 36, an output port 37, AD converters 38 and drive circuits 39 all of which are connected to one another by a bilateral bus 31. A pressure sensor 19 for outputting an output voltage proportional to the absolute pressure of the surge tank 10 is placed in the surge tank 10, and the output voltage of the pressure sensor 19 is applied to the input port 36 through the corresponding AD converter 38. A switching type air-fuel ratio sensor 20 called "$O_2$ sensor" is installed in the exhaust manifold 15 at an upstream of the NOx absorber catalyst 18, and the output of the air-fuel ratio sensor 20 is applied to the input port 36 through the corresponding AD converter 38. Another switching type air-fuel ratio sensor 22 called "$O_2$ sensor" is installed in the exhaust pipe 21 at a downstream of the NOx absorber catalyst 18, and the output of the air-fuel ratio sensor 22 is applied to the input port 36 through the corresponding AD converter 38. A revolution sensor 23 for generating an output pulse indicative of an engine speed N and a car speed sensor 24 for generating an output pulse indicative of a car speed are connected to the input port 36. The output port 37 is connected to the spark plug 4 and the fuel injection valve 11 via the respective drive circuits 39.

A description is subsequently given of the operation of the prior art device. A mixture having a lean air-fuel ratio (to be referred to as "lean mixture" hereinafter) is generally burnt in a combustion chamber 3. When the amount of nitrogen oxide NOx absorbed by the NOx absorber catalyst 18 exceeds a predetermined amount, the NOx discharge function of the NOx absorber catalyst 18 is started by controlling such that the air-fuel ratio of exhaust gas flowing into the NOx absorber catalyst 18 becomes rich.

SUMMARY OF THE INVENTION

However, the deterioration of the NOx absorber catalyst is roughly divided into two types: (1) deterioration such as thermal deterioration by which the catalyst cannot restore its NOx absorbing capability and (2) deterioration such as sulfur poisoning from which the NOx absorber catalyst can restore its NOx absorbing capability to a certain extent by some regeneration treatment. In the exhaust gas purifier for an internal combustion engine 1 disclosed by the aforementioned Japanese Laid-open Patent Application No. 8-232644, the above two different types of deterioration are handled in the same manner and the permissible amount of absorbed NOx is set based on the NOx absorbing capacity after judgment on deterioration. Since rich operation for judging the deterioration of the NOx absorber catalyst is carried out based on the air-fuel ratio A/F set as one pattern in the above publication, as shown in FIG. 20, when the air-fuel ratio for judgment is rich, a difference in deterioration is small whereas, as shown in FIG. 21, when the air-fuel ratio is not so rich, the difference becomes large but rich operation for judgment lasts for a long time, which is disadvantageous from the view point of fuel cost.

The NOx absorber catalyst 18 deteriorates gradually while it is used. The NOx absorbing capability of the NOx absorber catalyst 18 degrades as it deteriorates and the catalyst cannot absorb NOx in the end. Therefore, when the NOx absorber catalyst 18 is used, it is necessary to detect how much the NOx absorber catalyst 18 deteriorates. When the air-fuel ratio of exhaust gas flowing into the NOx absorber catalyst 18 is made rich, the air-fuel ratio of exhaust gas flowing out from the NOx absorber catalyst 18 becomes slightly lean while the NOx discharge function of the NOx absorber catalyst 18 is executed. When the NOx discharge function of the NOx absorber catalyst 18 is completed, it is found that the air-fuel ratio of exhaust gas flowing out from the NOx absorber catalyst 18 becomes rich. In this case, as the amount of NOx absorbed by the NOx absorber catalyst 18 is smaller, a time elapsed from the time when the air-fuel ratio of exhaust gas flowing into the NOx absorber catalyst 18 is made rich to the time when the air-fuel ratio of the exhaust gas flowing out from the NOx absorber catalyst 18 becomes rich is shorter. Therefore, the deterioration degree of the NOx absorber catalyst 18 can be detected from the above time elapsed.

It is an object of the present invention which has been made to solve the above problems to provide an exhaust gas purifier for an internal combustion engine which is capable of detecting the deterioration degree of an NOx absorber catalyst making use of a time elapsed from the time when the air-fuel ratio of exhaust gas flowing into the NOx absorber catalyst is made rich to the time when the air-fuel ratio of exhaust gas flowing out from the NOx absorber catalyst becomes rich.

According to a first aspect of the present invention, there is provided an exhaust gas purifier for an internal combustion engine which comprises an NOx absorber catalyst, air-fuel ratio sensor, first NOx estimating means, decision means, air-fuel switching means, second NOx estimating means and deterioration judging means, wherein the NOx absorber catalyst absorbs NOx when the air-fuel ratio of inflow exhaust gas is lean and purifies and discharges its absorbed NOx when the air-fuel ratio of inflow exhaust gas is rich, the air-fuel ratio sensor detects the concentration of oxygen contained in exhaust gas at a downstream of the NOx absorber catalyst, the first NOx estimating means obtains a first estimated amount of NOx estimated to be absorbed by the NOx absorber catalyst, the judging means judges whether the first NOx estimated amount obtained by the first NOx estimating means exceeds a decision level for judging that the first NOx estimated amount becomes the NOx maximum permissible amount of the NOx absorber catalyst, the air-fuel ratio switching means switches the air-fuel ratio of the exhaust gas from lean to rich to discharge NOx from the NOx absorber catalyst when the judging means judges that the first NOx estimated amount exceeds the above decision level, the second NOx estimating means obtains a second estimated amount of NOx from the length of a time elapsed from the time when the air-fuel ratio switching means switches the air-fuel ratio of exhaust gas from lean to rich to the time when the output of the air-fuel ratio sensor is changed to an output level corresponding to a rich air-fuel ratio, and the deterioration judging means judges the deterioration degree of the NOx absorber catalyst by comparing the second estimated amount of NOx obtained by the second NOx estimating means with the first estimated amount of NOx obtained by the first NOx estimating means. The deterioration judging means judges the deterioration degree of the NOx absorber catalyst with accuracy by lengthening a time required for the output of the air-fuel ratio sensor to change from lean to rich by reducing the rich degree of the exhaust gas at the time of switching the air-fuel ratio of the exhaust gas from lean to rich when the time required for the output of the air-fuel ratio sensor to change from lean to rich is shorter than a predetermined value and it is difficult to judge the deterioration degree of the NOx absorber catalyst.

According to a second aspect of the present invention, there is provided an exhaust gas purifier for an internal combustion engine, wherein the purifier further comprises an air-fuel ratio sensor for detecting the concentration of oxygen contained in exhaust gas at an upstream of the NOx absorber catalyst and the second NOx estimating means comprises means of starting the measurement of time when the air-fuel ratio is changed from lean to rich or when the output of the air-fuel ratio sensor at an upstream of the NOx absorber catalyst changes from lean to rich.

According to a third aspect of the present invention, there is provided an exhaust gas purifier for an internal combustion engine which further comprises sulfur regenerating means for carrying out the control of sulfur regeneration when the deterioration judging means judges that the deterioration degree of the NOx absorber catalyst exceeds a predetermined level.

According to a fourth aspect of the present invention, there is provided an exhaust gas purifier for an internal combustion engine which further comprises alarm generating means for generating an alarm when the deterioration judging means judges that the deterioration degree of the NOx absorber catalyst exceeds a predetermined level.

The above and other objects, features and advantages of the invention will become more apparent from the following description when taken in conjunction with the accompanying drawings.

BRIEF DESCRIPTION OF THE ACCOMPANYING DRAWINGS

Figure 6:
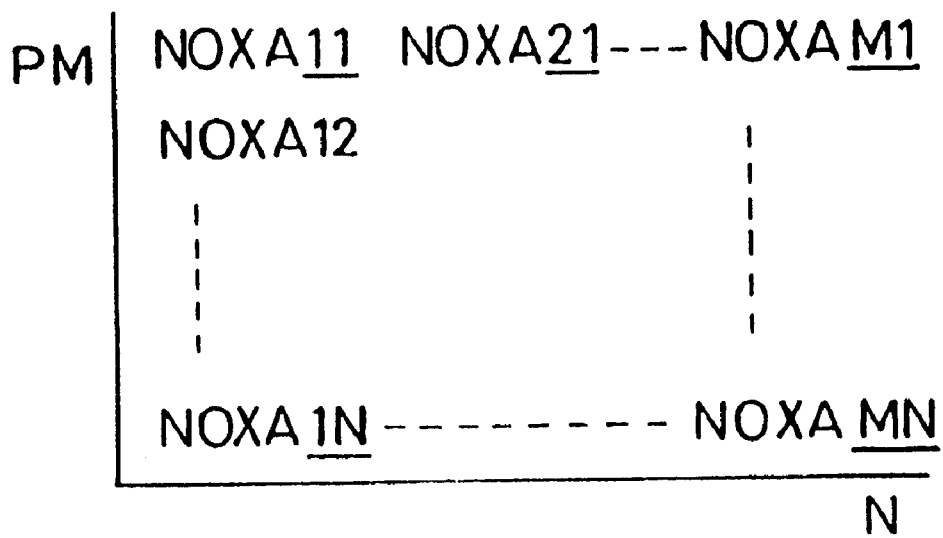
Figure 6:
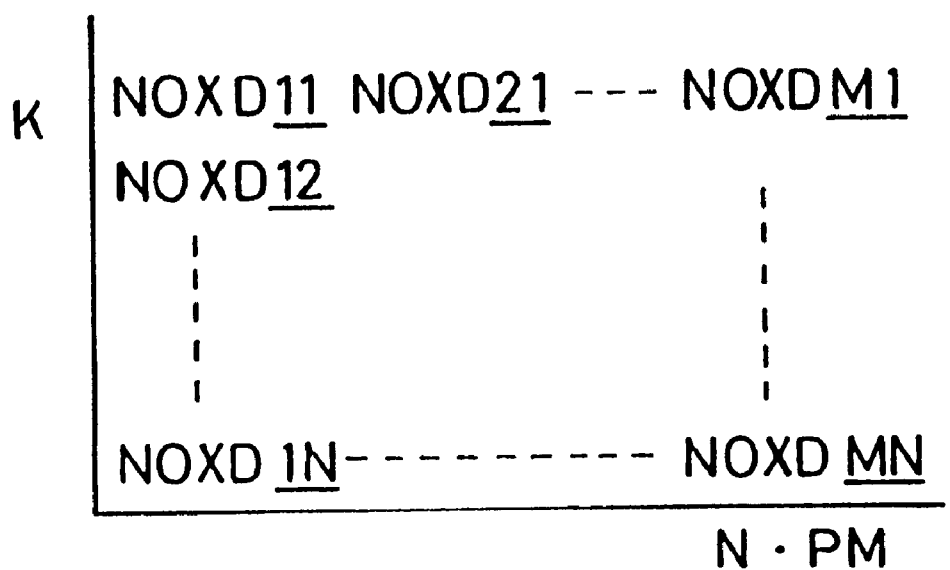
Figure 7A:
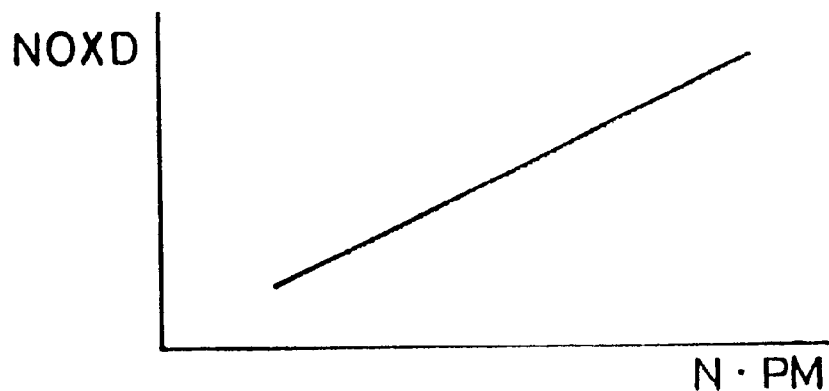
Figure 7B:
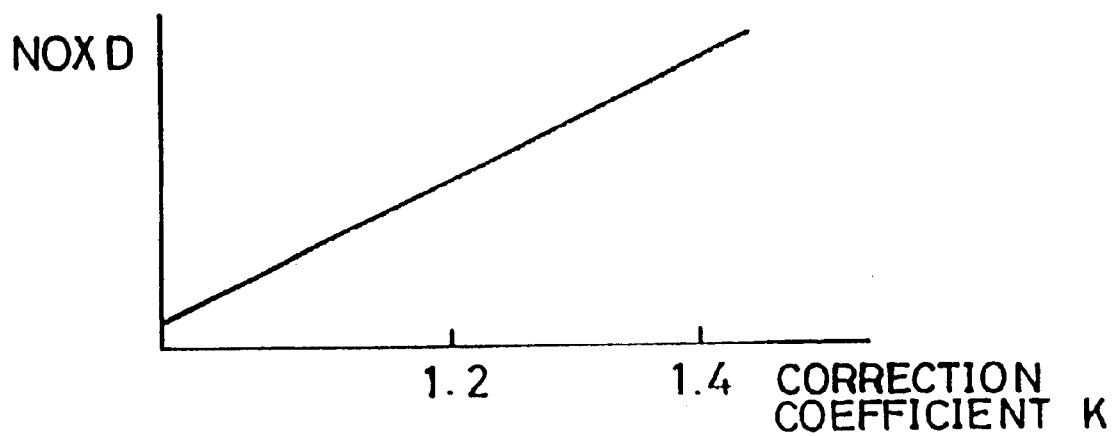
Figure 8:
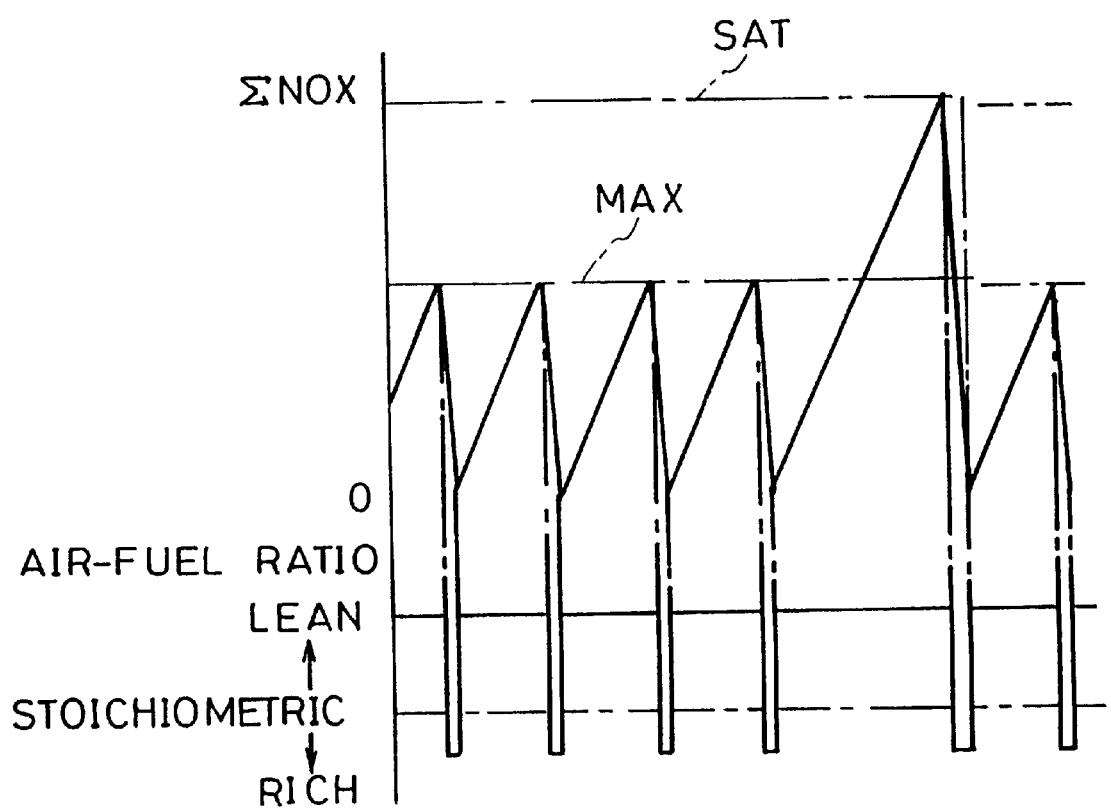
Figure 9:
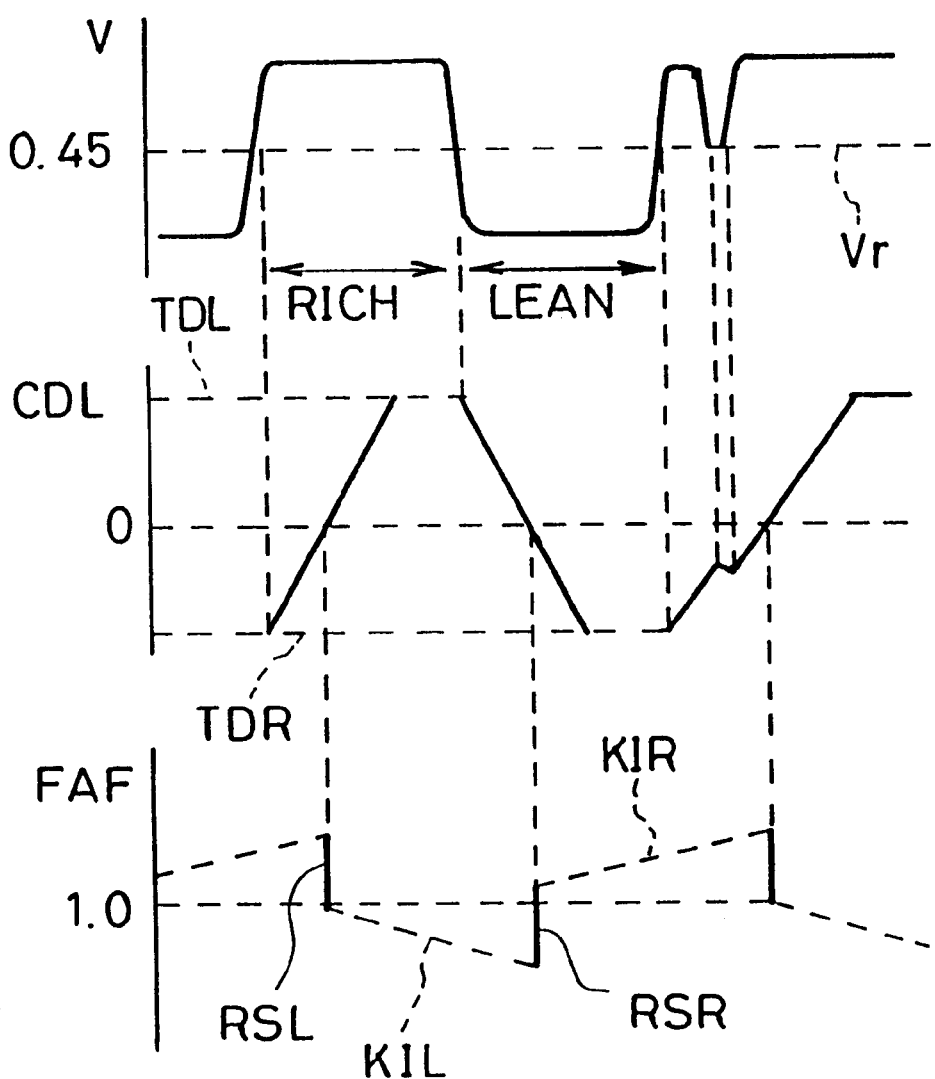
Figure 10:
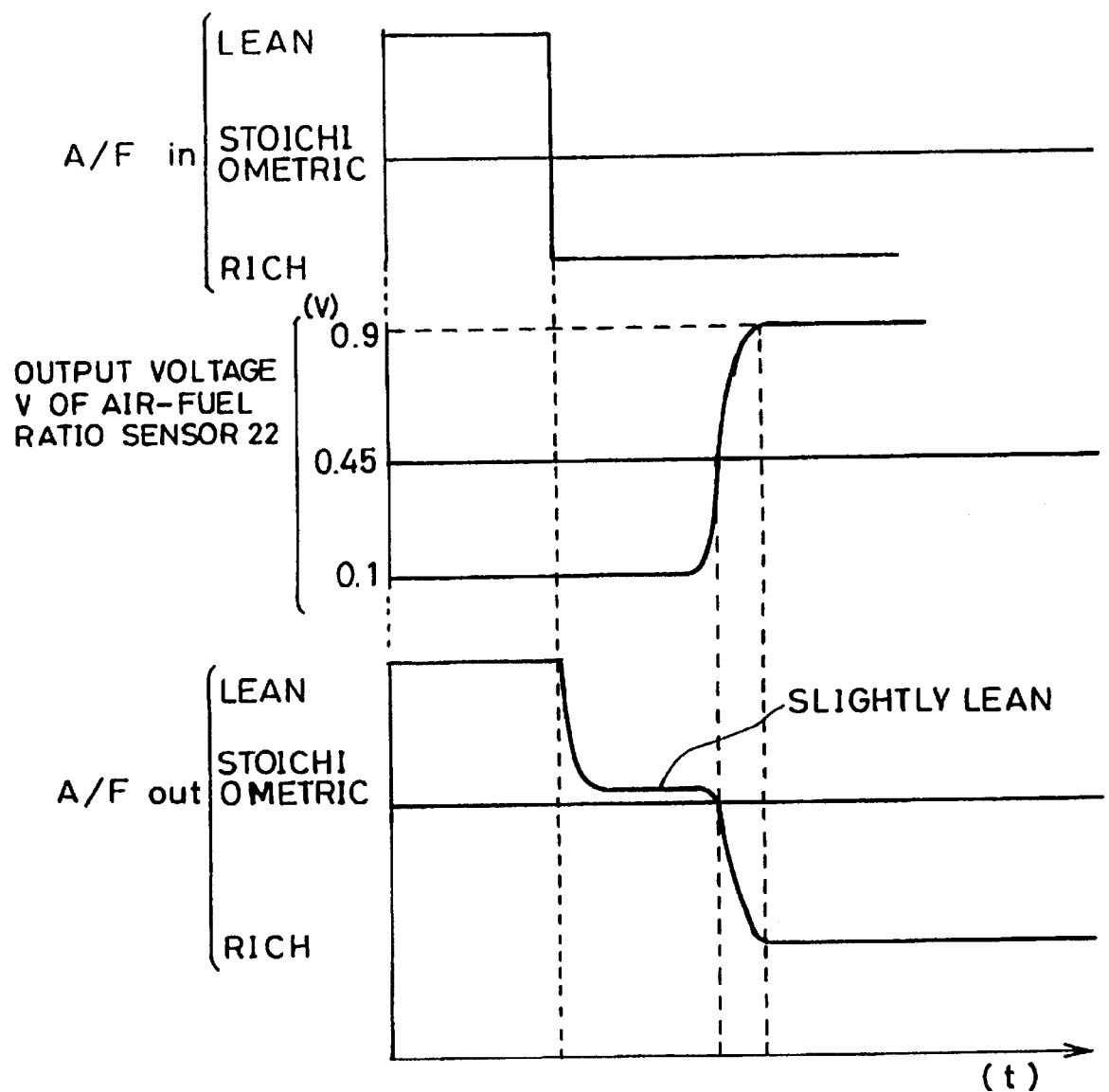
Figure 11:
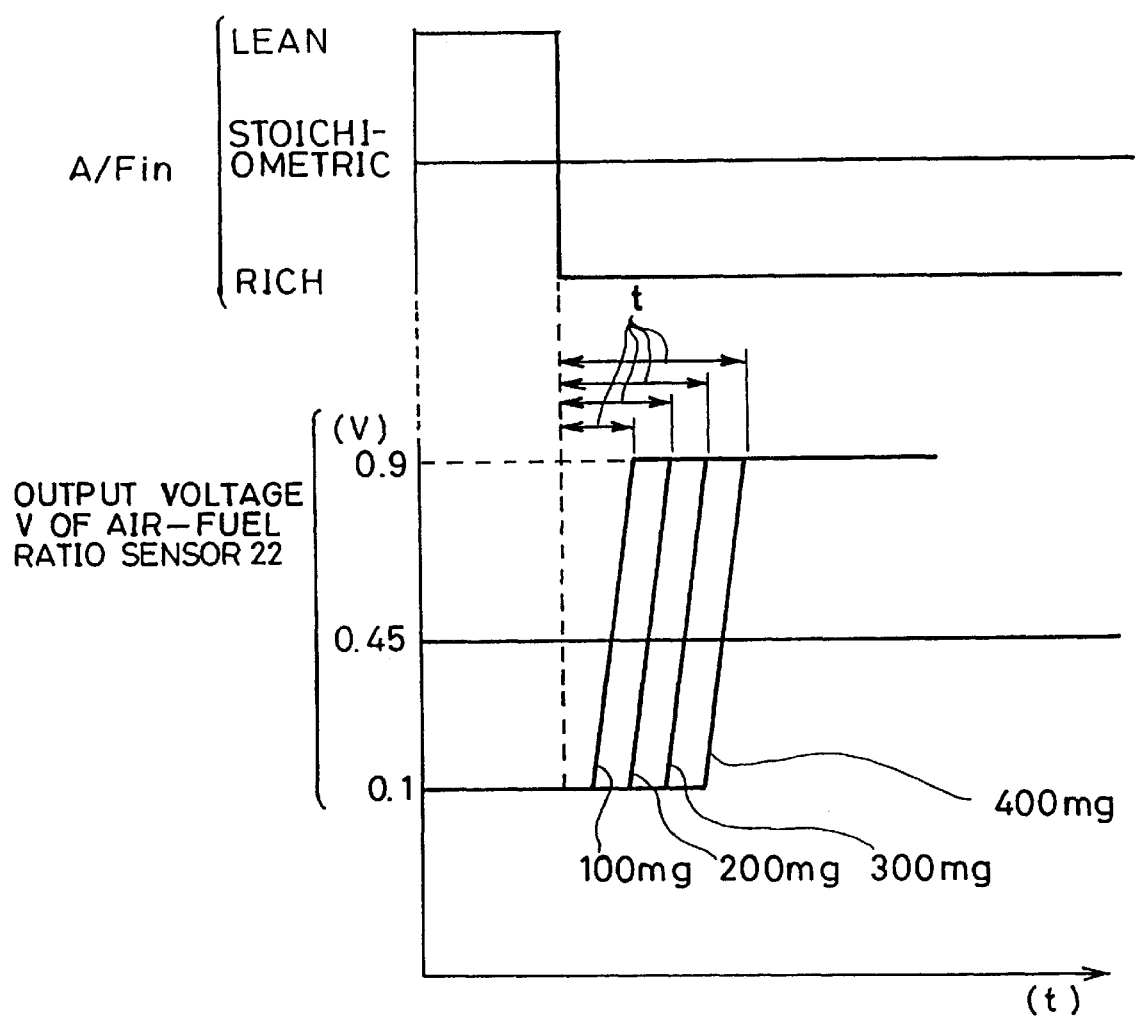
Figure 12:
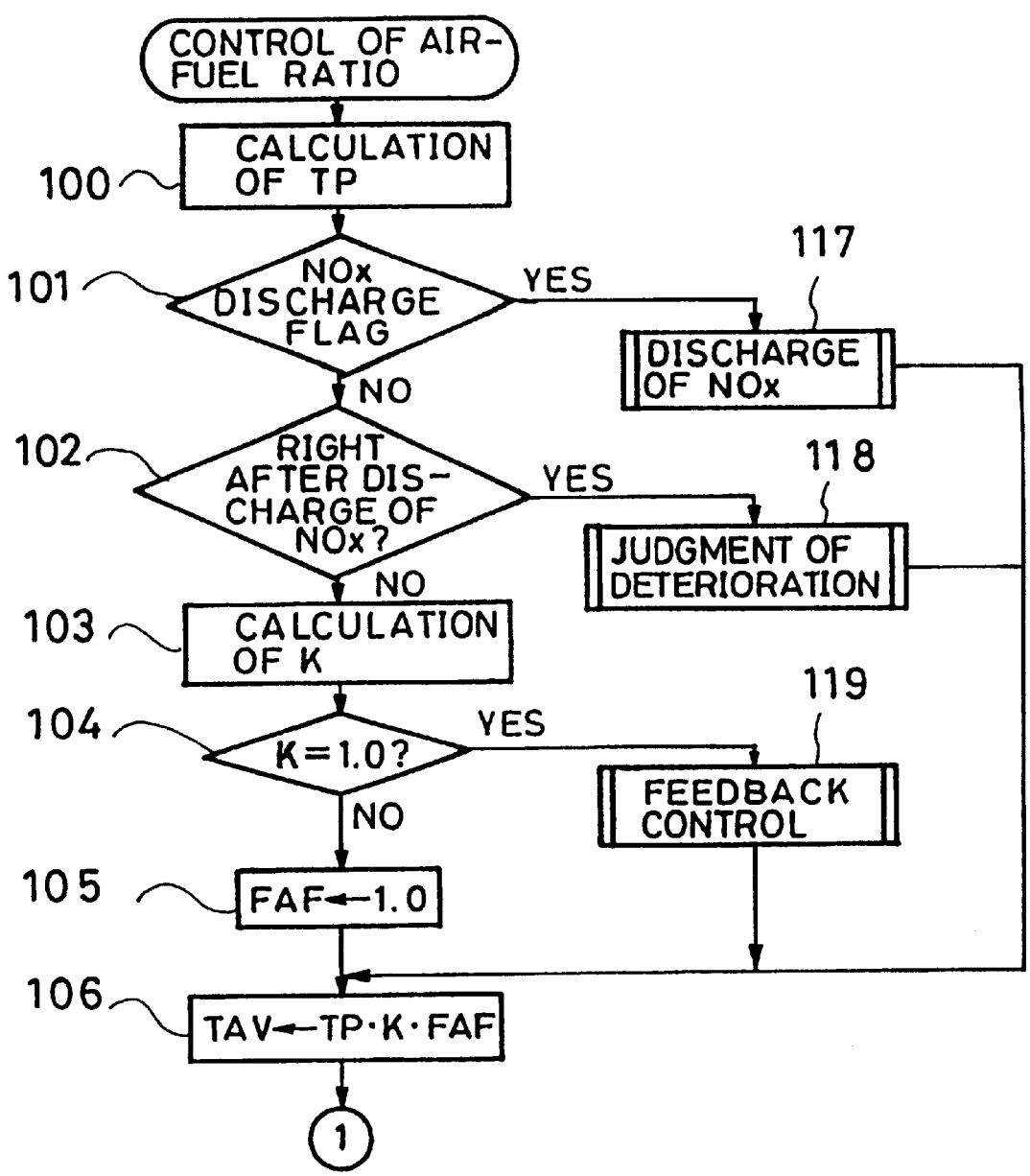
Figure 13:
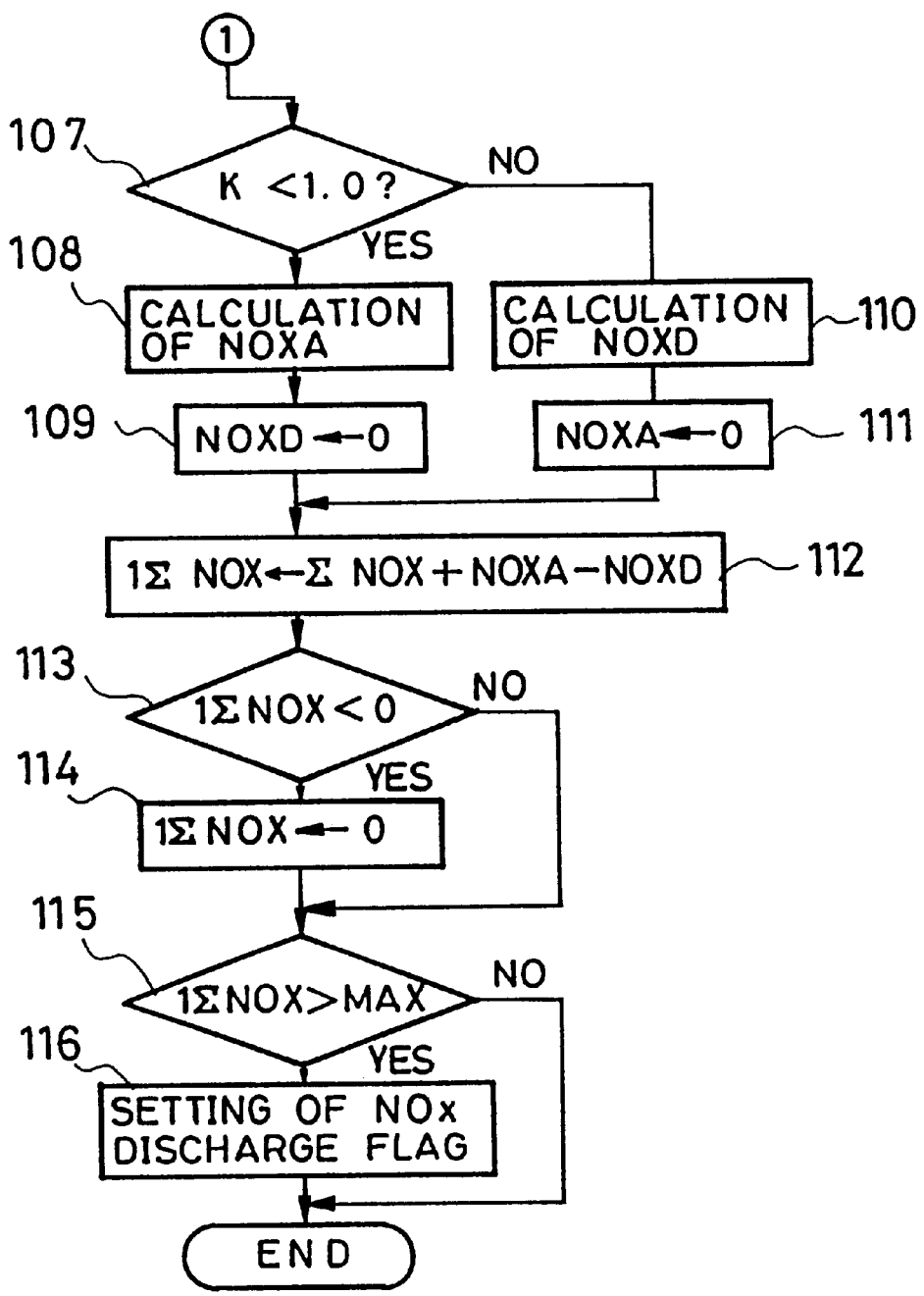
Figure 14:
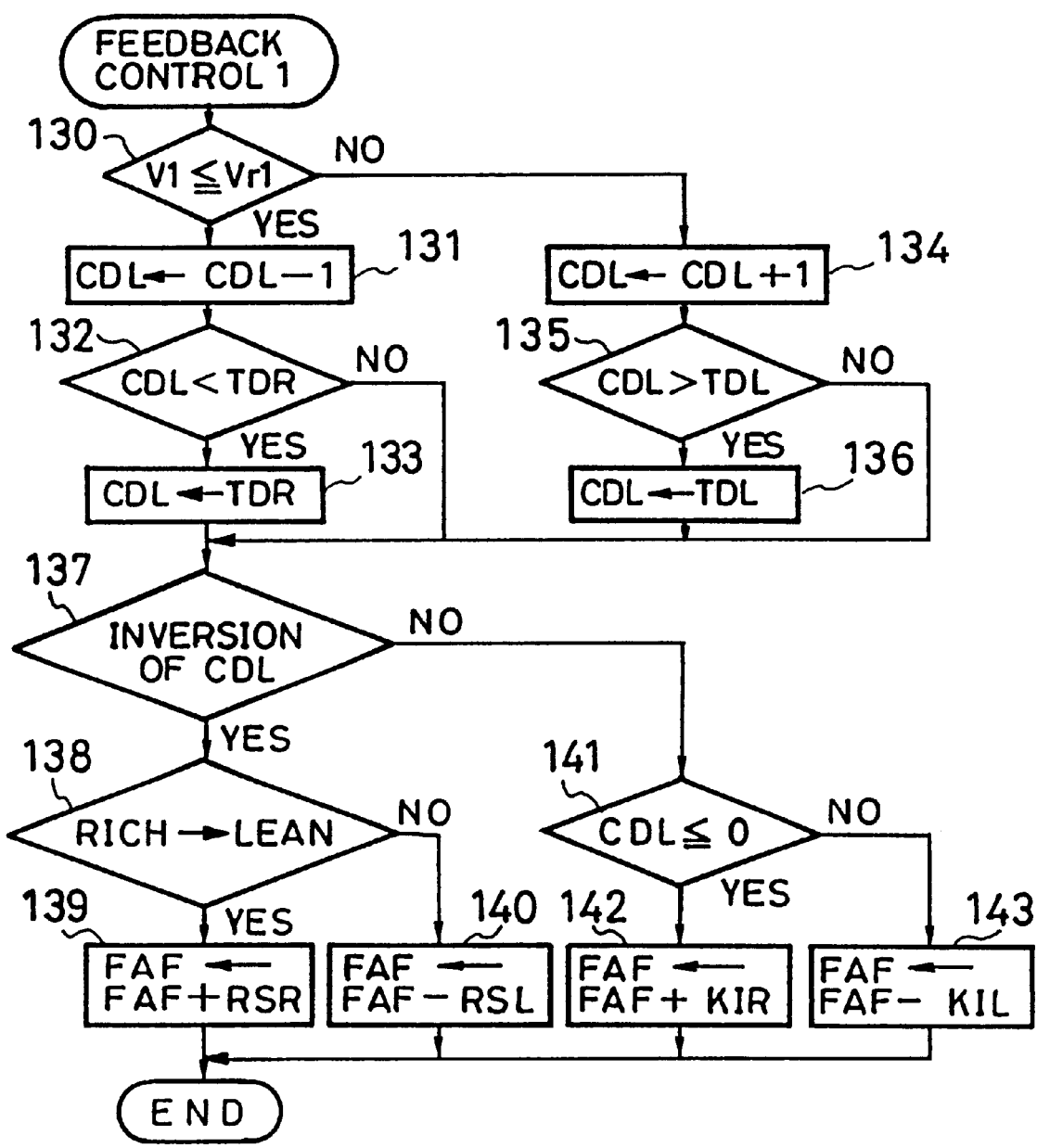
Figure 15:
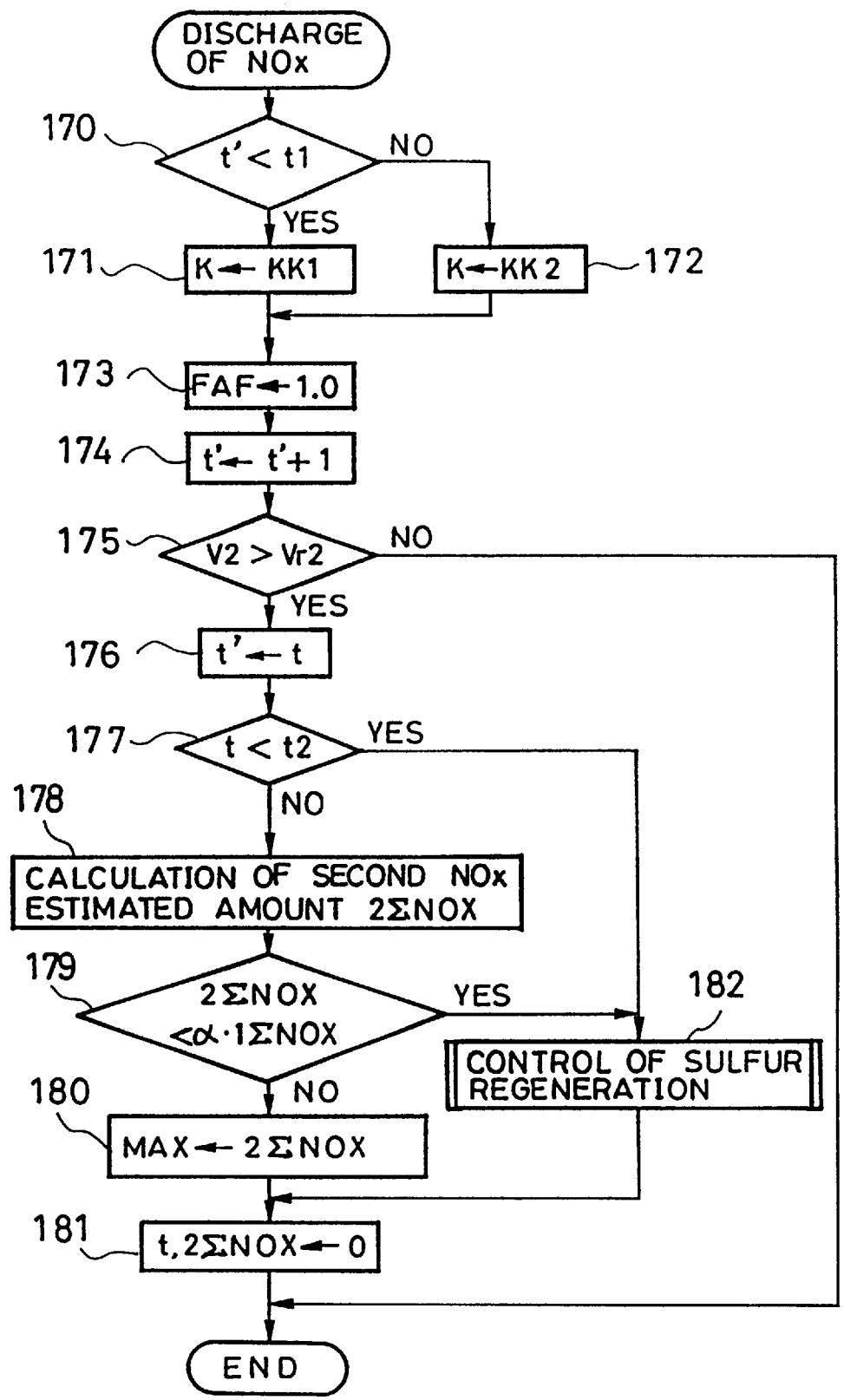
Figure 17:
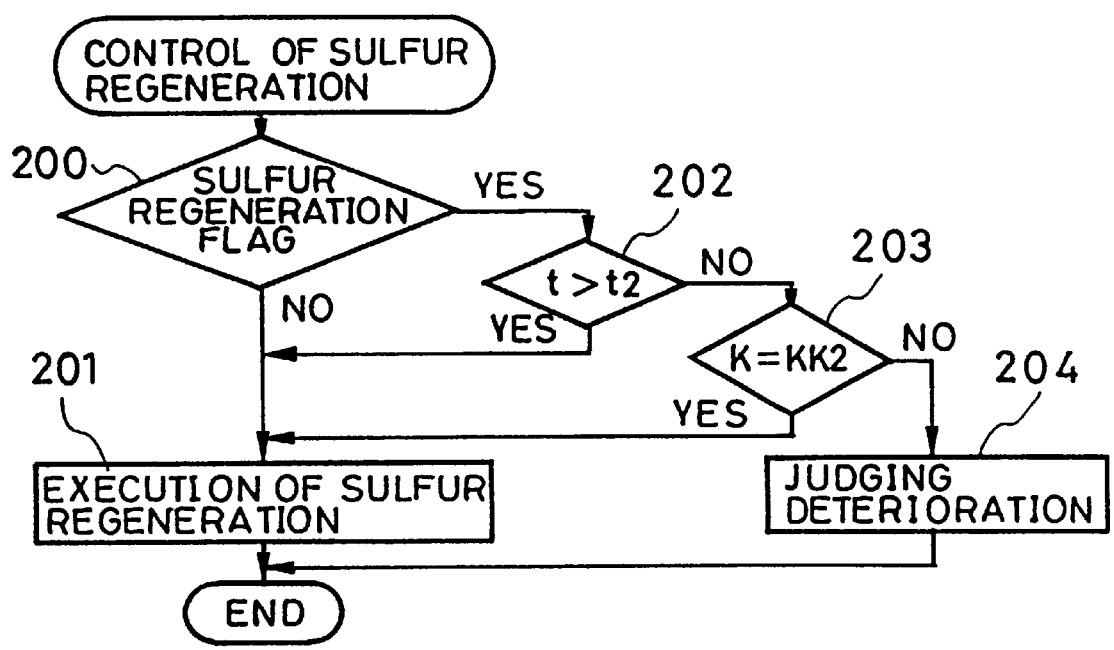
Figure 18:
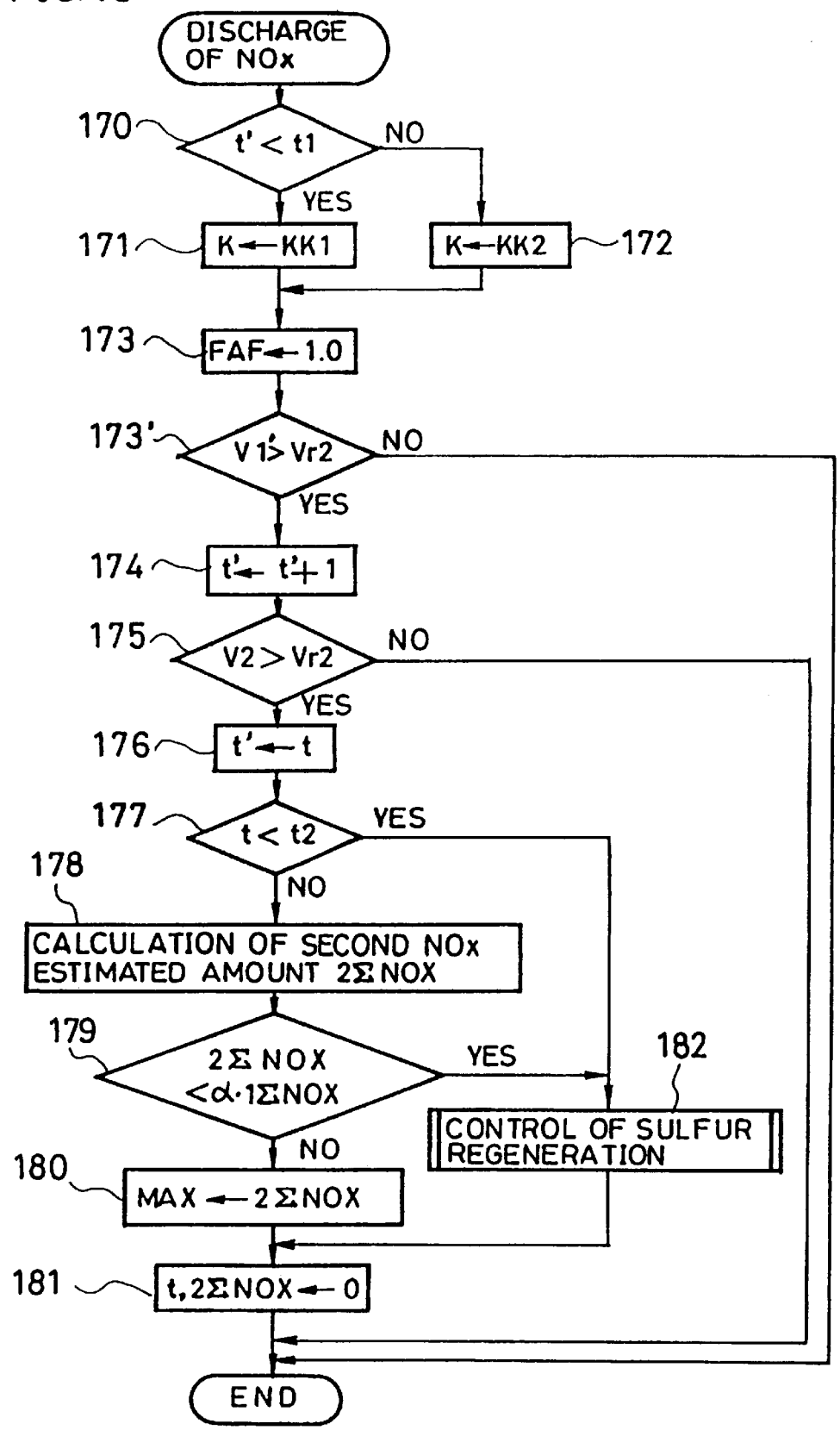
Figure 19:
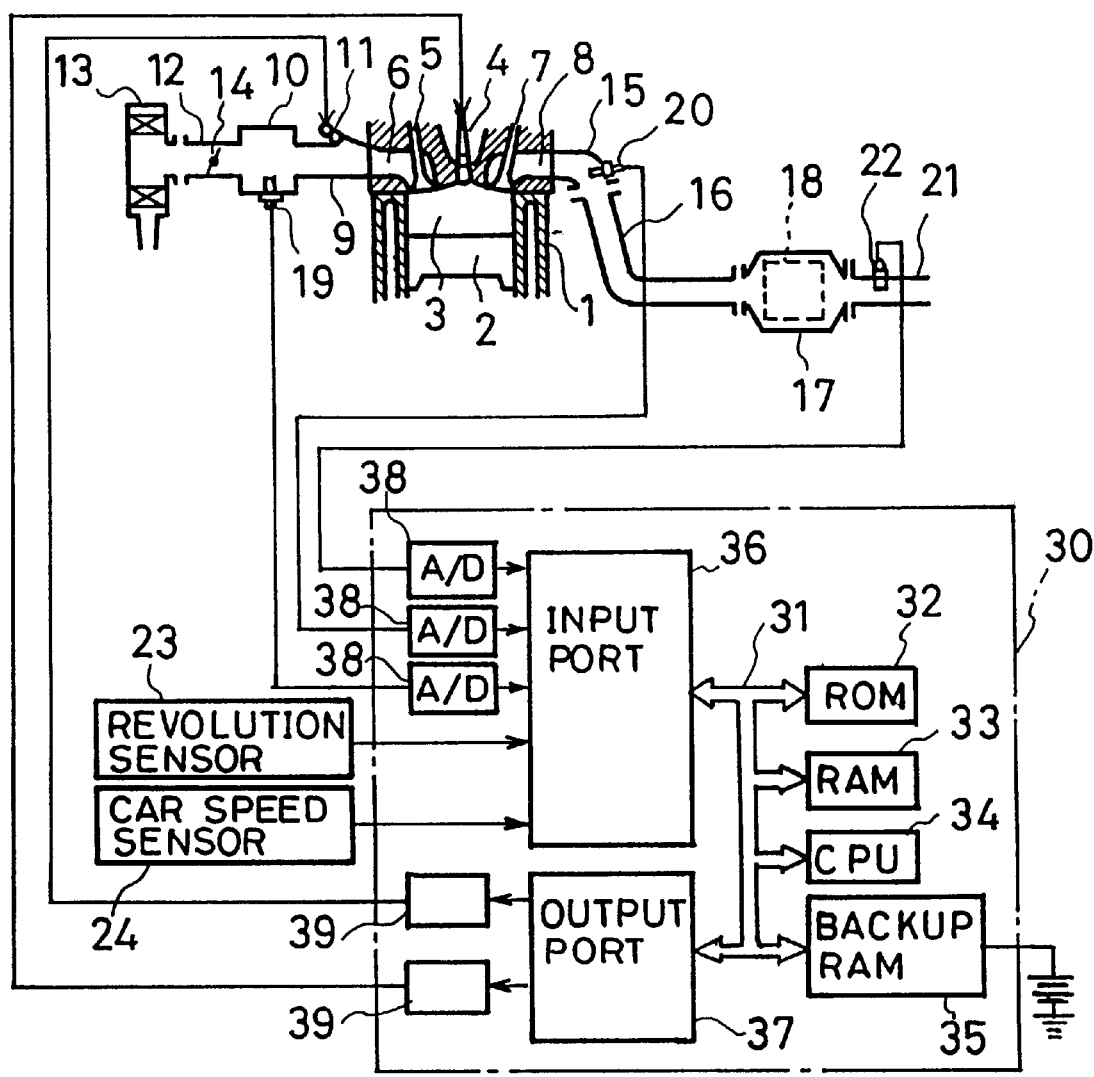
Figure 20:
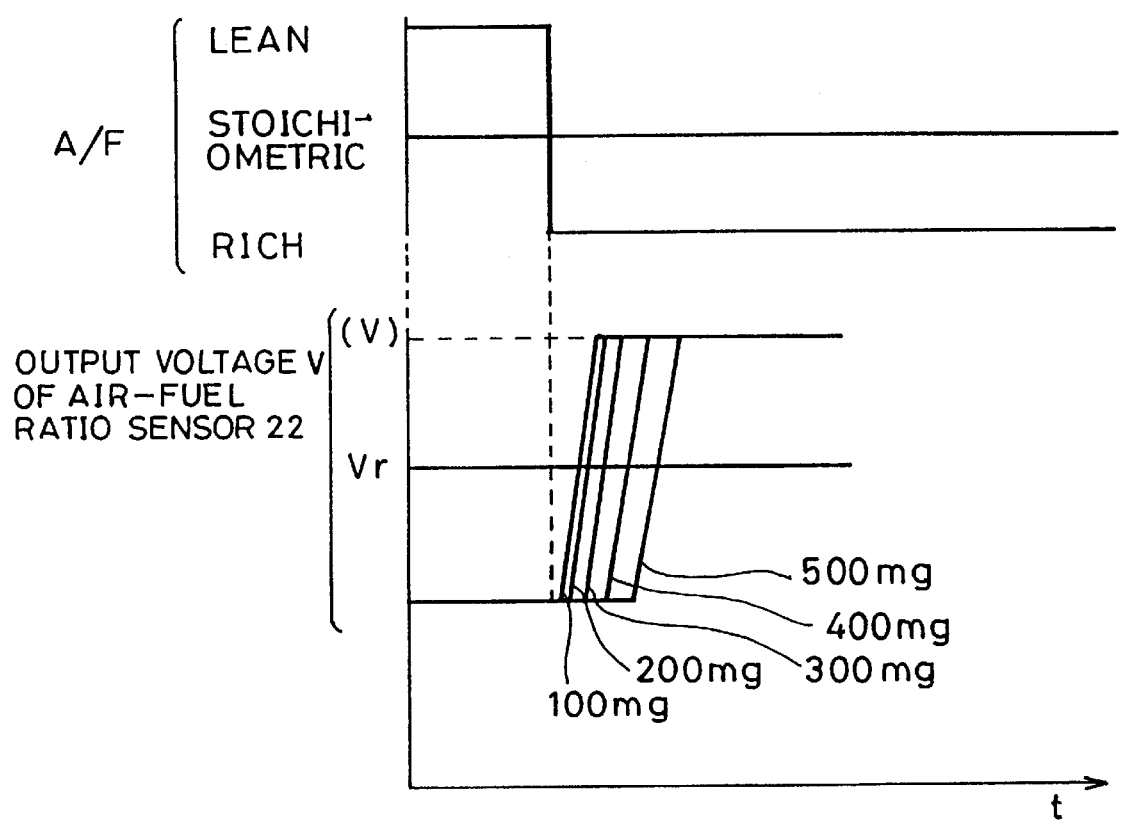
Figure 21:
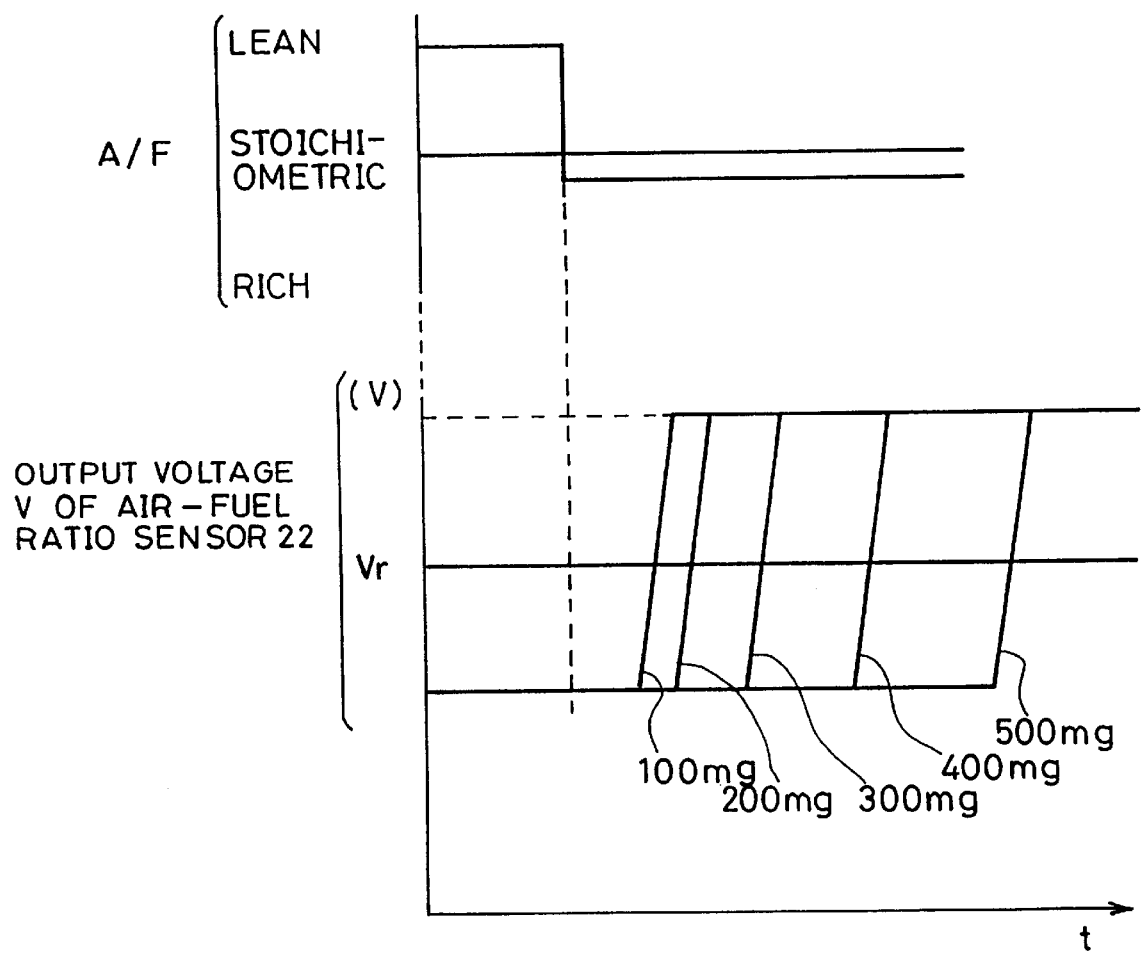

FIGS. 5(A), (B) are diagrams for explaining the NOx absorption and discharge functions of Embodiment 1;

FIGS. 6(A), (B) are diagrams showing the amount NOXA of absorbed NOx and the amount NOXD of discharged NOx;

FIGS. 7(A), (B) are diagrams showing the amount NOXD of discharged NOx of Embodiment 1;

FIG. 8 is a time chart for air-fuel ratio control of Embodiment 1;

FIG. 9 is a time chart showing the relationship between air-fuel ratio and the output voltage of the air-fuel ratio sensor of Embodiment 1;

FIG. 10 is a time chart showing the relationship between air-fuel ratio and the output voltage of the air-fuel ratio sensor of Embodiment 1;

FIG. 11 is a time chart showing the relationship between air-fuel ratio and the output voltage of the air-fuel ratio sensor of Embodiment 1;

FIG. 12 is a flow chart of air-fuel ratio control of Embodiment 1;

FIG. 13 is a flow chart of air-fuel ratio control of Embodiment 1;

FIG. 14 is a flow chart of feed-back control of Embodiment 1;

FIG. 15 is a flow chart of NOx discharge processing of Embodiment 1;

FIGS. 16(A), (B) are diagrams showing the relationship between time elapsed t and the amount of absorbed NOx of Embodiment 1;

FIG. 17 is a flow chart of sulfur regeneration control of Embodiment 1;

FIG. 18 is a flow chart of air-fuel ratio control of Embodiment 2 of the present invention;

FIG. 19 is a structural diagram of an exhaust gas purifier for an internal combustion engine of the prior art;

FIG. 20 is a diagram showing the relationship between air-fuel ratio and the response time of the air-fuel ratio sensor of the prior art; and FIG. 21 is a diagram showing the relationship between air-fuel ratio and the response time of the air-fuel ratio sensor of the prior art.

DETAILED DESCRIPTION OF THE PREFERRED EMBODIMENTS

Embodiment 1

Figure 1:
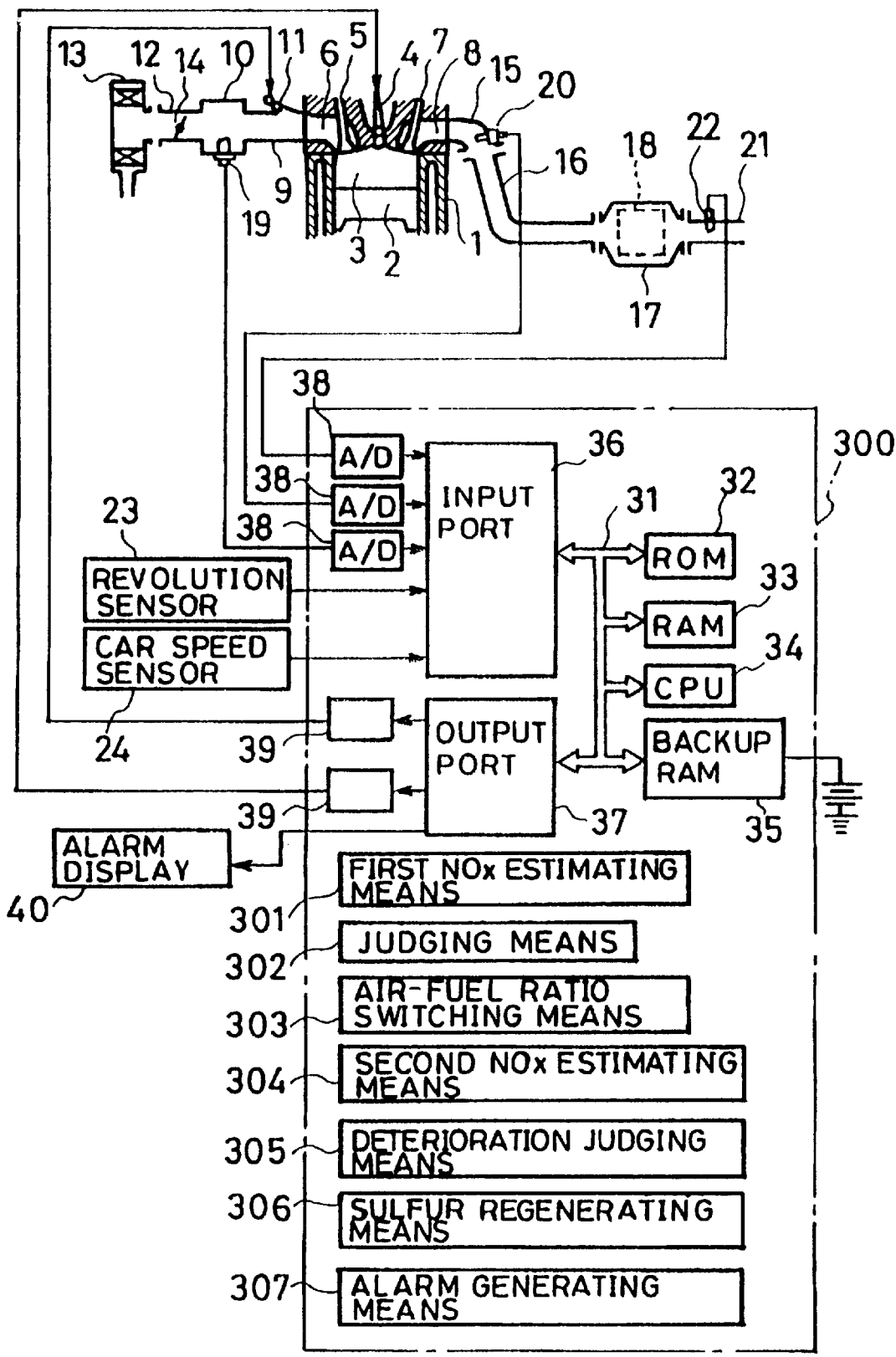
FIG. 1 is a structural diagram of a system according to Embodiment 1 of the present invention.

Embodiment 1 of the present invention will be described hereinunder with reference to FIGS. 1 to 17. FIG. 1 is a structural diagram of an exhaust gas purifier for an internal combustion engine 1. In FIG. 1, an electronic control unit 300 corresponds to the electronic control unit 30, as shown in FIG. 19, which is a digital computer. However, it differs from the electronic control unit 30 in that it comprises first NOx estimating means 301, judging means 302, air-fuel ratio switching means 303, second NOx estimating means 304, deterioration judging means 305, sulfur regenerating means 306 and alarm generating means 307. Such elements as the bilateral bus 31, ROM 32, RAM 33, CPU 34, back-up RAM 35, input port 36, output port 37, AD converters 38 and drive circuits 39 in the digital computer of the electronic control unit 300 are identical to those of FIG. 1. The CPU 34 reads a program stored in the ROM 32 using the RAM 33 as storage means to cause first NOx estimating means 301, judging means 302, air-fuel ratio switching means 303, second NOx estimating means 304, deterioration judging means 305, sulfur regenerating means 306 and alarm generating means 307 to execute the control processes of FIGS. 12 to 15 and FIG. 17. Reference numeral 40 denotes an alarm display which becomes active in response to the output of the alarm generating means 307. Such elements as the internal combustion engine 1, piston 2, combustion chamber 3, spark plug 4, inlet valve 5, inlet port 6, exhaust valve 7, exhaust port 8, branch pipe 9, surge tank 10, fuel injection valve 11, inlet duct 12, air cleaner 13, throttle valve 14, exhaust manifold 15, exhaust pipe 16, casing 17, NOx absorber catalyst 18, pressure sensor, air-fuel ratio sensor 20, exhaust pipe 21, air-fuel ratio sensor 22, revolution sensor 23 and car speed sensor 24 are identical to those shown in FIG. 19.

A description is subsequently given of the operation of Embodiment 1. The electronic control unit 300 calculates a fuel injection time TAV=TP·K·FAF. TP signifies a basic fuel injection time, K a correction coefficient and FA a feedback correction coefficient. The basic fuel injection time TP is a fuel injection time required to set the air-fuel ratio of a mixture to be supplied into the combustion chamber 3 to a stoichiometric value, which is obtained experimentally and stored in the ROM 32 in the form of a map shown in FIG. 2 as the function of absolute pressure PM in the surge tank 10 and engine speed N. The correction coefficient K is a coefficient for controlling the air-fuel ratio of the mixture. When the correction coefficient K=1.0, the air-fuel ratio of the mixture becomes stoichiometric, when the correction coefficient K<1.0, the air-fuel ratio of the mixture becomes larger (lean) than the stoichiometric value, and when the correction coefficient K>1.0, the air-fuel ratio of the mixture becomes smaller (rich) than the stoichiometric value.

The feedback correction coefficient FAF is a coefficient for accurately setting the air-fuel ratio of the mixture to a stoichiometric value based on the output signal of the air-fuel ratio sensor 20 when the correction coefficient K=1.0, that is, the air-fuel ratio of the mixture should be a stoichiometric value. This feedback correction coefficient FA hovers around 1.0. That is, it is small when the mixture becomes rich and large when the mixture becomes lean. When the correction coefficient K<1.0 or K>1.0, the feedback correction coefficient FAF is fixed at 1.0.

Figure 3:
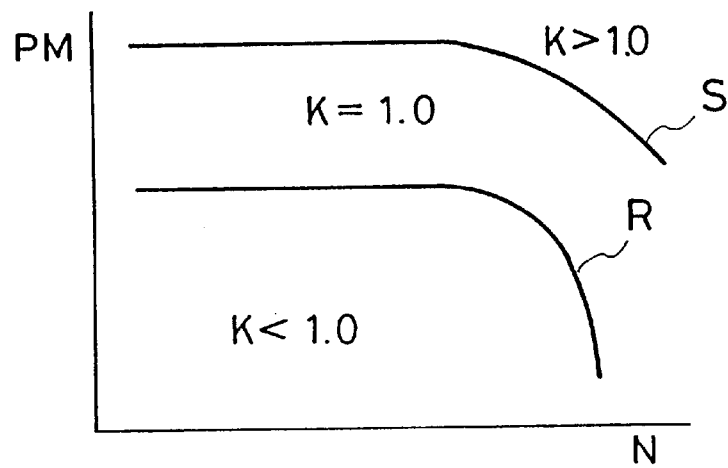
FIG. 3 is a diagram showing the correction coefficient K of Embodiment 1.

The value of the correction coefficient K as the control target air-fuel ratio of the mixture changes according to the operation state of the internal combustion engine 1. In Embodiment 1, as shown in FIG. 3 which shows the relationship among absolute pressure PM, engine speed N and correction coefficient K, the correction coefficient K is preset as the function of the absolute pressure PM and the engine speed N. In FIG. 3, K<1.0, that is, the air-fuel ratio of the mixture is lean at a low load operation range on a low load side of the solid line R, K=1.0, that is, the air-fuel ratio of the mixture is stoichiometric at a high load operation range between the solid line R and the solid line S, and K>1.0, that is, the air-fuel ratio of the mixture is rich at a total load operation range on a high load side of the solid line S.

Figure 4:
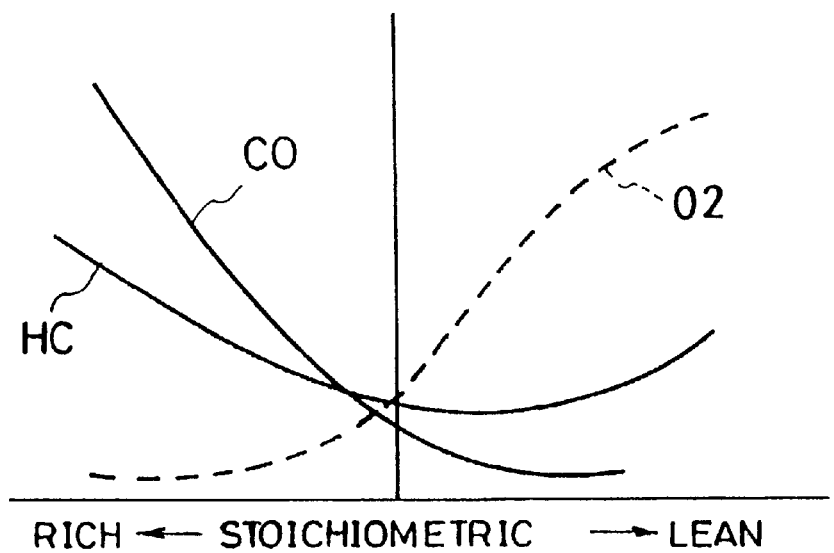
FIG. 4 is a diagram showing the concentrations of unburnt HC, CO and O2 contained in the exhaust gas of Embodiment 1.

FIG. 4 schematically shows the concentrations of unburnt hydrocarbon HC, carbon monoxide CO and oxygen $O_2$ as typical elements contained in exhaust gas discharged from the combustion chamber 3. As is understood from FIG. 4, the concentrations of hydrocarbon HC and carbon monoxide CO increase as the air-fuel ratio of the mixture supplied into the combustion chamber 3 becomes richer and the concentration of oxygen $O_2$ increases as the air-fuel ratio of the mixture becomes leaner.

The above NOx absorber catalyst 18 has at least one selected from the group consisting of alkali metals such as potassium K, sodium Na, lithium Li and cesium Cs, alkali earth metals such as barium Ba and calcium Ca, rare earth metals such as lanthanum La and yttrium Y and precious metals such as platinum Pt carried on alumina as a carrier. When the ratio of air supplied into an engine inlet passage and an exhaust passage at an upstream of the NOx absorber catalyst 18 to fuel (hydrocarbon) is called "air-fuel ratio of exhaust gas flowing into the NOx absorber catalyst 18", the NOx absorber catalyst 18 absorbs NOx when the air-fuel ratio of the inflow exhaust gas is lean and discharges its absorbed NOx when the concentration of oxygen contained in the inflow exhaust gas decreases, thus carrying out NOx absorption and discharge functions. When fuel or air is not supplied into the exhaust passage at an upstream of the NOx absorber catalyst 18, the air-fuel ratio of the inflow exhaust gas agrees with the air-fuel ratio of the mixture supplied into the combustion chamber 3, and the NOx absorber catalyst 18 absorbs NOx when the air-fuel ratio of the mixture is lean and discharges its absorbed NOx when the concentration of oxygen contained in the mixture decreases.

Figure 5:
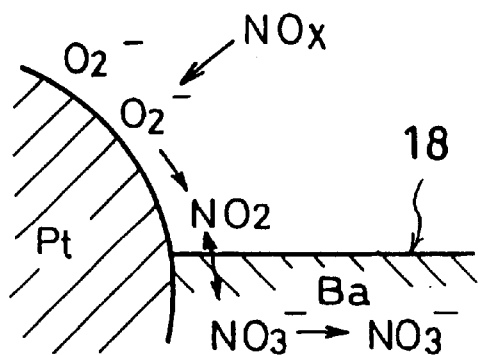
Figure 5:
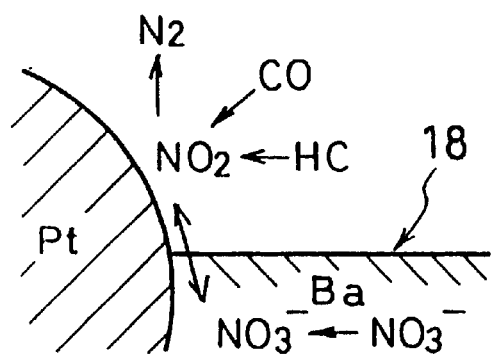

Although details of the mechanism of the NOx absorption and discharge functions of the NOx absorber catalyst 18 are not completely clarified, it is considered that the NOx absorption and discharge functions of the NOx absorber catalyst 18 are carried out based on the mechanism shown in FIG. 5. This mechanism will be described taking an NOx absorber catalyst having platinum Pt and barium Ba carried on the carrier as an example. When other precious metal, alkali metal, alkali earth metal or rare earth metal is used, the same mechanism is obtained.

When the exhaust gas flowing into the NOx absorber catalyst 18 becomes very lean, the concentration of oxygen contained in the inflow exhaust gas greatly increases. As shown in FIG. 5(A), the oxygen $O_2$ is adhered to the surface of platinum Pt in the form of oxygen ions $O_2^-$. Nitrogen oxide NOx contained in the inflow exhaust gas reacts with the oxygen ions $O_2^-$ on the surface of platinum Pt and becomes nitrogen dioxide $NO_2$ ($2NO+O_2^- \rightarrow 2NO_2$). Part of this formed nitrogen dioxide $NO_2$ is oxidized on platinum Pt, absorbed by the NOx absorber catalyst 18, bonded to barium oxide BaO and dispersed into the NOx absorber catalyst 18 in the form of nitric acid ions $NO_3^-$ as shown in FIG. 5(A). Thus, nitrogen oxide NOx is absorbed by the NOx absorber catalyst 18.

As far as the concentration of oxygen contained in the inflow exhaust gas is high, nitrogen dioxide $NO_2$ is formed on the surface of platinum Pt, and as far as the NOx absorbing capability of the NOx absorber catalyst 18 is not saturated, nitrogen dioxide $NO_2$ is absorbed by the NOx absorber catalyst 18 and nitric acid ions $NO_3^-$ are formed. In contrast to this, when the concentration of oxygen contained in the inflow exhaust gas and the amount of the formed nitrogen dioxide $NO_2$ decrease, the reaction proceeds backwards ($NO_3^- \rightarrow NO_2$), the nitric acid ions $NO_3^-$ contained in the NOx absorber catalyst 18 are discharged from the NOx absorber catalyst 18 in the form of nitrogen dioxide $NO_2$. That is, when the concentration of oxygen contained in the inflow exhaust gas decreases, nitrogen oxide NOx is discharged from the NOx absorber catalyst 18. As shown in FIG. 4, as the inflow exhaust gas becomes less lean, the concentration of oxygen contained in the inflow exhaust gas decreases. Therefore, nitrogen oxide NOx is discharged from the NOx absorber catalyst 18 by making the inflow exhaust gas less lean even if the air-fuel ratio of the inflow exhaust gas is lean.

When the mixture to be supplied into the combustion chamber 3 is made rich and the air-fuel ratio of the inflow exhaust gas becomes rich, as shown in FIG. 4, the amounts of unburnt hydrocarbon HC and carbon monoxide CO become large. These hydrocarbon HC and carbon monoxide CO react with oxygen ions $O_2^-$ on the surface of platinum Pt to be oxidized. When the air-fuel ratio of the inflow exhaust gas becomes rich, the concentration of oxygen contained in the inflow exhaust gas greatly decreases, whereby nitrogen oxide NOx is discharged from the NOx absorber catalyst 18. Nitrogen dioxide $NO_2$ which is this nitrogen oxide NOx reacts with the unburnt hydrocarbon HC and carbon monoxide CO to be reduced as shown in FIG. 5(B). When nitrogen dioxide $NO_2$ thus disappears from the surface of platinum Pt, nitrogen dioxide $NO_2$ is discharged from the NOx absorber catalyst 18 continuously. Therefore, when the air-fuel ratio of the inflow exhaust gas is made rich, nitrogen oxide NOx is discharged from the NOx absorber catalyst in a short period of time.

In other words, when the air-fuel ratio of the inflow exhaust gas is made rich, hydrocarbon HC and carbon monoxide CO first react with oxygen ions $O_2^-$ on the surface of platinum Pt immediately to be oxidized. If hydrocarbon HC and carbon monoxide CO still remain after oxygen ions $O_2^-$ on the surface of platinum Pt are consumed, nitrogen oxide NOx discharged from the NOx absorber catalyst 18 and nitrogen oxide NOx discharged from the combustion chamber 3 are reduced by these hydrocarbon HC and carbon monoxide CO. Therefore, when the air-fuel ratio of the inflow exhaust gas is made rich, nitrogen oxide NOx absorbed by the NOx absorber catalyst 18 is discharged and reduced in a short period of time, thereby making it possible to prevent nitrogen oxide NOx from being exhausted into the air.

As described above, when the lean mixture is burnt, nitrogen oxide NOx is absorbed by the NOx absorber catalyst 18. However, the NOx absorber catalyst has the limits of its NOx absorbing capability. When the NOx absorbing capability of the NOx absorber catalyst 18 is saturated, the NOx absorber catalyst 18 cannot absorb nitrogen oxide NOx any more. Therefore, before the NOx absorbing capability of the NOx absorber catalyst 18 is saturated, nitrogen oxide NOx must be discharged from the NOx absorber catalyst 18. To this end, it is necessary to estimate how much the NOx absorber catalyst 18 absorbs nitrogen oxide NOx.

How to estimate the amount of absorbed NOx will be described hereinunder. When the lean mixture is burnt, as an engine load becomes greater, the amount of NOx discharged from the combustion chamber 3 per unit time increases, whereby the amount NOXA of NOx absorbed by the NOx absorber catalyst 18 per unit time grows. Further, as the engine speed becomes higher, the amount of NOx discharged from the combustion chamber 3 per unit time increases, whereby the amount of NOx absorbed by the NOx absorber catalyst 18 per unit time grows. Therefore, the amount NOXA of the absorbed NOx is the function of engine load and engine speed N. Since the engine load can be represented by the above absolute pressure PM in this case, the amount NOXA of the absorbed NOx is the function of absolute pressure PM and engine speed N. Therefore, in Embodiment 1, the amount NOXA of the absorbed NOx is obtained from experiments as the function of absolute pressure PM and engine speed N and stored in the ROM 32 in the form of a map shown in FIG. 6(A) as the function of absolute pressure PM and engine speed N.

When the air-fuel ratio of the mixture to be supplied into the combustion chamber 3 becomes stoichiometric or rich, NOx is discharged from the NOx absorber catalyst 18 and the amount of the discharged NOx is influenced by the amount of exhaust gas and the air-fuel ratio of the mixture. That is, as the amount of exhaust gas becomes larger, the amount NOXD of NOx discharged from the NOx absorber catalyst 18 per unit time increases and as the air-fuel ratio of the mixture becomes richer, the amount NOXD of the discharged NOx grows. Therefore, the amount NOXD of the discharged NOx is the function of the amount of intake air and engine speed N. In this case, as shown in FIG. 7(A), the amount NOXD of the discharged NOx increases as N·PM becomes larger. In this Embodiment 1, the amount NOXD of the discharged NOx is prestored in the ROM 32 in the form of a map shown in FIG. 6(B) as the function of N·PM and K.

As described above, since the amount of the absorbed NOx is represented by NOXA when the air-fuel ratio of the mixture is lean and the amount of the discharged NOx is represented by NOXD when the air-fuel ratio of the mixture is stoichiometric or rich, the first estimated amount of NOx absorbed by the NOx absorber catalyst 18 is represented by the equation 1 $\Sigma NOX = \Sigma NOX + NOXA - NOXD$. The $\Sigma NOX$ is an estimated amount of NOx in the previous processing cycle.

In this Embodiment 1, as shown in FIG. 8 which is an air-fuel ratio control time chart, the first estimated amount 1 $\Sigma NOX$ of the absorbed NOx reaches the maximum permissible amount MAX, nitrogen oxide NOx is discharged from the NOx absorber catalyst 18 by making the air-fuel ratio of the mixture rich temporarily.

SOx is contained in exhaust gas and not only nitrogen oxide NOx but also sulfur oxide SOx are absorbed by the NOx absorber catalyst 18. The mechanism that this sulfur oxide SOx is absorbed by the NOx absorber catalyst 18 is considered to be the same as that of nitrogen oxide NOx. That is, taking an NOx absorber catalyst 18 having platinum Pt and barium Ba carried on the carrier as an example like the NOx absorption mechanism, when the air-fuel ratio of exhaust gas flowing into the NOx absorber catalyst 18 is lean, oxygen $O_2$ is adhered to the surface of platinum Pt in the form of oxygen ions $O_2^-$. $SO_2$ contained in exhaust gas (to be referred to as "inflow exhaust gas" hereinafter) flowing into the NOx absorber catalyst 18 reacts with the oxygen ions $O_2^-$ on the surface of platinum P and becomes $SO_3$. Part of this formed $SO_3$ is further oxidized on the surface of platinum Pt, is bonded to barium oxide BaO in the NOx absorber catalyst 18, dispersed into the NOx absorber catalyst 18 in the form of sulfuric acid ions $SO_4^{2-}$ and forms a stable sulfate $BaSO_4$.

However, the sulfate $BaSO_4$ is stable and hardly decomposed. Even when the air-fuel ratio of the mixture is made rich in a short period of time as shown in FIG. 8, almost all the sulfate $BaSO_4$ is not decomposed and remains as it is. Therefore, with the passage of time, the amount of the sulfate BaSO4 contained in the NOx absorber catalyst 18 increases. Hence, with the passage of time, the maximum amount of NOx able to be absorbed by the NOx absorber catalyst 18 gradually decreases. In other words, the performance of the NOx absorber catalyst 18 deteriorates gradually with the passage of time. When the maximum amount of NOx able to be absorbed by the NOx absorber catalyst 18 lowers, NOx must be discharged from the NOx absorber catalyst 18 while the amount of NOx absorbed by the NOx absorber catalyst 18 is small. To this end, it is necessary to detect the maximum amount of NOx able to be absorbed by the NOx absorber catalyst 18, that is, the deterioration degree of the NOx absorber catalyst 18 with accuracy.

In Embodiment 1, the amount of NOx actually absorbed by the NOx absorber catalyst 18, that is, the deterioration degree of the NOx absorber catalyst 18 is detected as follows. The deterioration degree of the NOx absorber catalyst 18 is detected from a time elapsed from the time when the air-fuel ratio of the mixture changes from lean to rich to the time when the voltage of the air-fuel ratio sensor 22 changes from a voltage indicative of a lean air-fuel ratio to a voltage indicative of a rich air-fuel ratio. That is, when the mixture supplied into the combustion chamber 3 becomes rich, as shown in FIG. 4, exhaust gas containing unburnt hydrocarbon HC, carbon monoxide CO and oxygen $O_2$ is discharged from the combustion chamber 3. However, oxygen $O_2$ rarely reacts with hydrocarbon HC and carbon monoxide CO and is exhausted into the air through the NOx absorber catalyst 18.

When the mixture becomes rich, nitrogen oxide NOx is discharged from the NOx absorber catalyst 18. The unburnt hydrocarbon HC and carbon monoxide CO contained in this exhaust gas are used to reduce nitrogen oxide NOx discharged from the NOx absorber catalyst 18. Therefore, while NOx is discharged from the NOx absorber catalyst 18, the unburnt hydrocarbon HC and carbon monoxide CO are not discharged from the NOx absorber catalyst 18 at all. Consequently, while nitrogen oxide NOx is discharged from the NOx absorber catalyst 18, exhaust gas discharged from the NOx absorber catalyst 18 contains oxygen $O_2$ but not the unburnt hydrocarbon HC and carbon monoxide CO at all, and the air-fuel ratio of exhaust gas discharged from the NOx absorber catalyst 18 is slightly lean.

Thereafter, when NOx absorbed by the NOx absorber catalyst 18 is completely discharged, unburnt hydrocarbon HC and carbon monoxide CO contained in exhaust gas are directly discharged from the NOx absorber catalyst 18 without being used to reduce nitrogen oxide NOx in the NOx absorber catalyst 18, whereby the air-fuel ratio of exhaust gas discharged from the NOx absorber catalyst 18 becomes rich. That is, when nitrogen oxide NOx absorbed by the NOx absorber catalyst 18 is completely discharged, exhaust gas discharged from the NOx absorber catalyst 17 changes from lean to rich. In this case, the amount NOXA of the absorbed NOx is proportional to a time elapsed from the time when the air-fuel ratio of exhaust gas flowing into the NOx absorber catalyst 18 is switched from lean to rich to the time when the air-fuel ratio of exhaust gas discharged from the NOx absorber catalyst 18 becomes rich. Therefore, the amount NOXA of the absorbed NOx can be obtained from this time elapsed.

This will be detailed with reference to FIG. 9 which shows the relationship between air-fuel ratio A/F and the output voltages of the air-fuel ratio sensors 20 and 22. As shown in FIG. 9, the air-fuel ratio sensors 20 and 22 output a voltage of about 0.9 V when the air-fuel ratio of the mixture to be supplied into the combustion chamber 3 is rich, about 0.1 V when the air-fuel ratio of the mixture is lean and about 0.45 V when the air-fuel ratio of the mixture is stoichiometric.

FIG. 10 shows the relationship among changes in the air-fuel ratio A/Fin of exhaust gas flowing into the NOx absorber catalyst 18 (to be referred to as "air-fuel ratio of inflow exhaust gas" hereinafter), changes in the output voltage V of the air-fuel ratio sensor 22 and changes in the air-fuel ratio A/Fout of exhaust gas flowing out from the NOx absorber catalyst 18 (to be referred to as "air-fuel ratio of outflow exhaust gas" hereinafter). As shown in FIG. 10, when the air-fuel ratio A/Fin of the inflow exhaust gas is switched from lean to rich, the air-fuel ratio A/Fout of the outflow exhaust gas rapidly decreases to around a stoichiometric level. However, while the NOx absorber catalyst 18 discharges NOx, the air-fuel ratio A/Fout of the outflow exhaust gas is maintained at a slightly lean level. Therefore, the output voltage V of the air-fuel ratio sensor 22 is about 0.1 V. Thereafter, when nitrogen oxide NOx absorbed by the NOx absorber catalyst 18 is completely discharged, the air-fuel ratio A/Fout of the outflow exhaust gas rapidly decreases and becomes rich and the voltage V of the air-fuel ratio sensor 22 rapidly rises to about 0.9 V.

FIG. 11 shows changes in the output voltage V of the air-fuel ratio sensor 22 according to the amount NOXA of the absorbed NOx. Numerical values 100 mg, 200 mg, 300 mg and 400 mg in FIG. 11 indicate the amount NOXA of the absorbed NOx. As shown in FIG. 11, as the amount NOXA of the absorbed NOx is larger, a rise in the voltage V of the air-fuel ratio sensor 22 is delayed more.

To detect the deterioration degree of the NOx absorber catalyst 18, when the first NOx estimated amount 1ΣNOX becomes the maximum permissible amount MAX, it is necessary to switch the air-fuel ratio A/Fin of the inflow exhaust gas from lean to rich and to obtain the time elapsed t. The second NOx estimated amount 2 ΣNOX is obtained from this time elapsed t and compared with the first NOx estimated amount 1ΣNOX. FIG. 12 and FIG. 13 show a routine for judging the deterioration degree of the NOx absorber catalyst 18 based on the time elapsed t required for a change in the output voltage V of the air-fuel ratio sensor 22 shown in FIG. 11.

Figure 2:
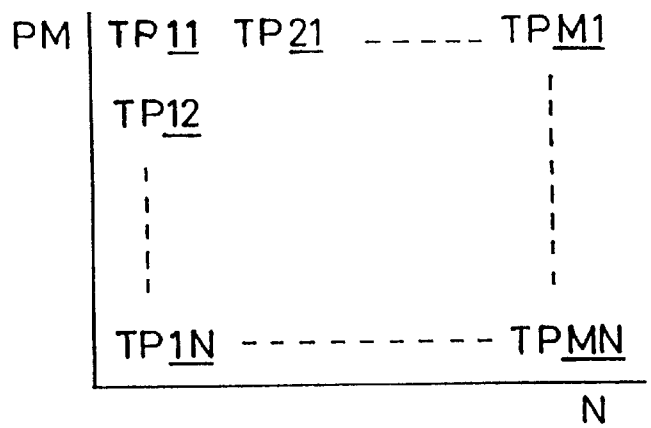
FIG. 2 is a diagram showing the map of the basic fuel injection time of Embodiment 1.

With reference to FIG. 12 and FIG. 13, the basic amount TP of injected fuel is calculated from FIG. 2 in step 100. In step 101, it is judged whether a NOx discharge flag is set to indicate that nitrogen oxide NOx should be discharged from the NOx absorber catalyst 18. When the NOx discharge flag is not set, it is judged whether a NOx discharge flag has been reset in step 102. When the NOx discharge flag has not been reset, a correction coefficient K is calculated from FIG. 3 in step 103. In step 104, it is judged whether the correction coefficient K is 1.0. When K=1.0, the feedback control of the air-fuel ratio is carried out in step 119. This feedback control is shown in FIG. 14. When it is judged in the above step 104 that K is not equal to 1.0, the feedback correction coefficient FAF is fixed at 1.0 in step 105 and the fuel injection time TAV=TP·K·FAF is calculated in step 106.

In step 107, it is judged whether the correction coefficient K is smaller than 1.0. When K<1.0, that is, the lean mixture should be burnt, the amount NOXA of the absorbed NOx is calculated from FIG. 6(A) in step 108, the amount NOXD Of the discharged NOx is set to 0 in step 109, and the routine proceeds to step 112. When it is judged in the above step 107 that K≧1.0, that is, a stoichiometric mixture or lean mixture should be burnt, the amount NOXD of the discharged NOx is calculated from FIG. 6(B) in step 110, the amount NOXA of the absorbed NOx is set to 0 in step 111, and the routine proceeds to step 112.

Figure 16:
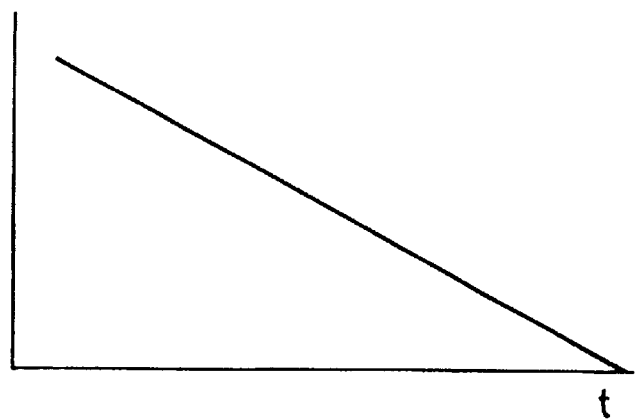
Figure 16:
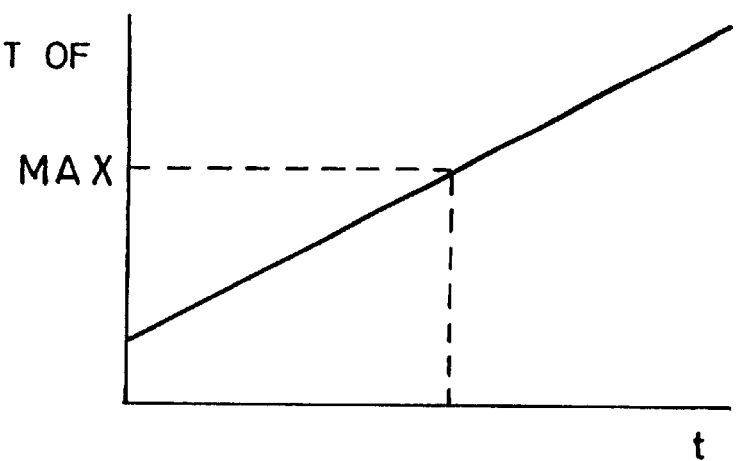

The first NOx estimated amount 1ΣNOX=ΣNOX+ NOXA–NOXD is calculated in step 112 and it is judged in step 113 whether the first NOx estimated amount 1 ΣNOX becomes negative. When 1 ΣNOX<0, 1 ΣENOX is set to 0 in step 114. In step 115, it is judged whether the fist NOx estimated amount 1ΣNOX is larger than the maximum permissible amount MAX. When 1ΣNOX>MAX, the NOx discharge flag is set in step 116. When the NOx discharge flag is set, NOx discharge processing is carried out instep 117. This NOx discharge processing is shown in FIG. 15. When it is judged that the NOx discharge flag has been reset (see step 102), deterioration is judged in step 118. This deterioration judgment is shown in FIG. 16.

The feedback control for maintaining the air-fuel ratio at a stoichiometric level based on the output voltage V1 of the air-fuel ratio sensor 20 which is carried out in step 119 of FIG. 12 will be described with reference to FIG. 14. As described above, the air-fuel ratio sensor 20 generates an output voltage V1 of about 0.9 V when the mixture is rich. As shown in FIG. 14, it is judged in step 130 whether the output voltage V1 is equal to or smaller than the first reference voltage Vr1 which is about 0.45 V. When V1≦Vr1, that is, the air-fuel ratio is lean, the delay count value CDL is decremented by 1 in step 131. In the subsequent step 132, it is judged whether the delay count value CDL is smaller than the smallest value TDR. When CDL<TDR, the delay count value CDL is set to the smallest value TDR in step 133 and the routine proceeds to step 137. Therefore, when V1≦Vr1, the delay count value CLD is decremented in each cycle of routine processing and is maintained at TDR in the end.

When it is judged in step 130 that V1>Vr1, that is, the air-fuel ratio is rich, the delay count value CDL is incremented by 1 in step 134. Thereafter, it is judged in step 135 whether the delay count value CDL is larger than the largest value TDL. When CDL>TDL, the delay count value CDL is set to TDL in step 136 and the routine proceeds to step 137. Therefore, when V1 >Vr1, the delay count value CDL is incremented in each cycle of routine processing and is maintained at TDL in the end.

It is judged in step 137 whether the sign of the delay count value CDL is changed from positive to negative or from negative to positive during a time interval from the previous processing cycle to the current processing cycle. When the sign of the delay count value CDL is changed, it is judged in step 138 whether the sign of the delay count value is changed from positive to negative, that is, the air-fuel ratio is changed from rich to lean. When it is judged that the air-fuel ratio is changed from rich to lean, a rich skip value RSR is added to the feedback correction coefficient FAF in step 139 and the feedback correction coefficient FAF is thus increased by the rich skip value RSR abruptly. When it is judged in the above step 138 that the air-fuel ratio is not changed from rich to lean, a lean skip value RSL is subtracted from the feedback correction coefficient FAF in step 140 and the feedback correction coefficient FAF is thus decreased by the lean skip value RSL abruptly.

When it is judged in the above step 137 that the sign of the delay count value CDL is not changed, it is judged in step 141 whether the sign of the delay count value CDL is negative. When CDL≦0, a rich integral value KIR (KIR <RSR) is added to the feedback correction coefficient FAF in step 142 and the feedback correction coefficient FAF thus increments in each cycle of the processing routine. When it is judged in the above step 141 that CDL>0, a lean integral value KIL is subtracted from the feedback correction coefficient FAF in step 143 and the feedback correction coefficient thus decrements in each cycle of the processing routine. As a result, the air-fuel ratio is controlled to a stoichiometric value.

NOx discharge control which is carried out in the step 118 of FIG. 12 will be described with reference to FIG. 15. As shown in FIG. 15, it is judged in step 170 whether the time elapsed t' at the time of NOx discharge control in the previous processing cycle is shorter than the predetermined first reference time t1. When t'≦t1, the correction coefficient K is changed to a relatively large predetermined value KK2, for example, about 1.2 in step 172 and when t'<t1, the correction coefficient K is changed to a relatively small predetermined value KK1, for example, about 1.05 in step 171. The feedback correction coefficient FAF is fixed at 1.0 in the subsequent step 173, the time elapsed t' is incremented by 1 in step 174 (time elapsed t' t'+1), and it is judged in step 175 whether the output voltage V2 of the air-fuel ratio sensor 22 becomes larger than the predetermined second reference voltage Vr2 (for example, 0.45 V). When V2>Vr2, the time elapsed t' is updated to t which is larger than t' by 1 in step 176. It is then judged in step 177 whether the time t is shorter than the second reference time t2. The second reference time t2 is a constant which differs according to whether the correction coefficient K is KK1 or KK2. When t≧t2, the second estimated amount 2ΣNOx of NOx absorbed by the NOx absorber catalyst 18 is calculated based on the time elapsed t from the relationships shown in FIG. 16A and FIG. 16(B) in step 178. Thereafter, the value α·1 ΣNOx obtained by multiplying the first NOx estimated amount 1ΣNOx by a certain value α(desirable a value of 0.9 to 1.0) is compared with the second NOx estimated amount 2ΣNOx. When 2ΣNOx≧α·ΣNOx, the deterioration of the catalyst is considered to be within the permissible range and the maximum permissible amount MAX of NOx absorbed by the NOx absorber catalyst 18 is updated to the second NOx estimated amount 2ΣNOx in step 180.

Sulfur regeneration control which is carried out when t<t2 in the above step 177 or when 2ΣNOx<α·1ΣNOx in the above step 179 will be described with reference to FIG. 17. As shown in FIG. 17, it is judged in step 200 whether a sulfur regeneration flag for judging whether sulfur regeneration control was carried out in the NOx discharge control of the previous processing cycle is set. When sulfur regeneration was not carried out in the previous processing cycle, it is judged that the NOx absorber catalyst 18 is deteriorated by poisoning or the like in the current cycle, and sulfur regeneration is carried out in step 201. When it is judged in the above step 200 that sulfur regeneration was carried out in the previous processing cycle, it is judged in step 202 whether the time elapsed t for purifying NOx in the current processing cycle is longer than the second reference time t2. When t>t2, sulfur regeneration control is carried out in step 201. When it is judged in the above step 202 that t≦t2, it is judged in step 203 whether the correction coefficient K is equal to a larger constant KK2. When K=KK2, the deterioration of the NOx absorber catalyst 18 is considered to be within the permissible range and sulfur regeneration control is carried out instep 201. When it is judged in the above step 203 that K=KK1, it is judged in step 204 that the NOx absorber catalyst deteriorates and an alarm display 40 is activated to inform the driver of the deterioration of the NOx absorber catalyst 18 by sound, image or voice. Deterioration in the catalytic performance of the NOx absorber catalyst 18 caused by sulfur oxide SOx contained in exhaust gas is called "sulfur poisoning" and the restoration of the NOx absorbing capability of the NOx absorber catalyst 18 by decomposing a sulfate $BaSO_4$ as the cause of this sulfur poisoning is called "sulfur regeneration". The control of this sulfur regeneration means the operation of maintaining the inlet temperature of the NOx absorber catalyst 18 at 600 to 700° C. for a predetermined time (for example, 100 seconds) in a rich environment.

Embodiment 2

In the above Embodiment 1, after the feedback correction coefficient FAF is fixed at 1.0 in the step 173 of the NOx discharge control of FIG. 17, the time elapsed t' is incremented by 1 in step 174 (t'←t'+1) in step 174. As shown in FIG. 18, step 173' is inserted between the step 173 and step 174 to judge whether the output voltage V1' which is the output voltage V1 per minute of the air-fuel ratio sensor 20 at an upstream of the NOx absorber catalyst 18 is larger than the first reference voltage Vr1. When V1'>Vr1, the time elapsed t' is incremented by 1 in step 174 and when V1'≦Vr1, the processing of controlling the discharge of NOx is terminated. Therefore, according to Embodiment 2 shown in FIG. 18, since the air-fuel ratio of exhaust gas is measured by the air-fuel ratio sensor 20 at an upstream of the NOx absorber catalyst 18 and the measurement of the time elapsed is started after the exhaust gas becomes rich, the time elapsed t can be measured without being influenced by a delay time from the time when the air-fuel ratio is switched from lean to rich by the air-fuel ratio switching means to the time when the exhaust gas actually becomes rich. Therefore, the second NOx estimated amount 2ΣNOx can be calculated with more accuracy.

According to the first and second aspects of the present invention, when the first estimated amount of NOx absorbed by the NOx absorber catalyst exceeds a decision level, it is estimated that the amount of NOx absorbed by the NOx absorber catalyst becomes maximum, the air-fuel ratio of exhaust gas flowing into the NOx absorber catalyst is switched from lean to rich, the second estimated amount of NOx is obtained from a time required for a change in the output level of the air-fuel ratio sensor, the deterioration of the NOx absorber catalyst is judged by comparison between the first NOx estimated amount and the second NOx estimated amount, and the time required for the change in the output level is lengthened by reducing the rich degree of exhaust gas at the time of rich operation when the time required for the change in the output level of the air-fuel ratio sensor is shorter than a predetermined time, thereby making it possible to judge the deterioration degree of the NOx absorber catalyst with more accuracy.

According to the third aspect of the present invention, when it is judged that the deterioration degree of the NOx absorber catalyst exceeds a predetermined level, the control of sulfur regeneration is carried out. Therefore, the absorption capability of the NOx absorber catalyst can be developed with more accuracy.

According to the fourth aspect of the present invention, it is possible to prevent a vehicle from being kept driven while exhaust gas is deteriorated by alarming deterioration in the NOx absorption capability of the NOx absorber catalyst.

What is claimed is:

1. An exhaust gas purifier for an internal combustion engine comprising:

a NOx absorber catalyst for absorbing NOx when an air-fuel ratio of inflow exhaust gas is lean, and purifying and discharging its absorbed NOx when the air-fuel ratio of inflow exhaust gas is rich;

an air-fuel ratio sensor for detecting a concentration of oxygen contained in exhaust gas downstream from the NOx absorber catalyst;

first NOx estimating means for obtaining a first estimated amount of NOx estimated to be absorbed by the NOx absorber catalyst;

judging means for judging whether the first estimated amount of NOx obtained by the first NOx estimating means exceeds a decision level for judging whether the first NOx estimated amount becomes a maximum permissible amount of NOx of the NOx absorber catalyst;

air-fuel ratio switching means for switching the air-fuel ratio of the exhaust gas from lean to rich in order to discharge NOx from the NOx absorber catalyst when the judging means judges that the first NOx estimated amount exceeds a decision level;

second NOx estimating means for obtaining a second estimated amount of NOx estimated to be absorbed by the NOx absorber catalyst, based on the length of a time elapsed from a time when the air-fuel ratio of exhaust gas is switched from lean to rich by the air-fuel ratio switching means to a time when an output of the air-fuel ratio sensor changes to a level corresponding to a rich air-fuel ratio; and deterioration judging means for judging a deterioration degree of the NOx absorber catalyst by comparing the first NOx estimated amount obtained by the first NOx estimating means with the second NOx estimated amount obtained by the second NOx estimating means, wherein the deterioration judging means judges the deterioration degree of the NOx absorber catalyst with accuracy by lengthening an elapsed time between a time when the air-fuel ratio of exhaust gas is switched from lean to rich to a time when the output of the air-fuel ratio sensor changes from lean to rich, by reducing a rich degree of the exhaust gas at the time of switching the air-fuel ratio of exhaust gas from lean to rich, when said elapsed time is shorter than a predetermined value and it is difficult to judge the deterioration degree.

2. The exhaust gas purifier of claim 1, further comprising an air-fuel ratio sensor for detecting a concentration of oxygen contained in exhaust gas upstream from the NOx absorber catalyst and the second NOx estimating means comprising means for starting a measurement of time when the air-fuel ratio is changed from lean to rich or when an output of the air-fuel ratio sensor upstream from the NOx absorber catalyst changes from lean to rich.

3. The exhaust gas purifier of claim 1, further comprising sulfur regenerating means for controlling sulfur regeneration when the deterioration judging means judges that the deterioration degree of the NOx absorber catalyst exceeds a predetermined level.

4. The exhaust gas purifier of claim 2, further comprising alarm regenerating means for generating an alarm when the deterioration judging means judges that the deterioration degree of the NOx absorber catalyst exceeds a predetermined level.

* * * * *